(12) United States Patent
Gupta et al.

(10) Patent No.: US 10,079,841 B2
(45) Date of Patent: Sep. 18, 2018

(54) AUTOMATED RUNTIME DETECTION OF MALWARE

(71) Applicant: Virsec Systems, Inc., Acton, MA (US)

(72) Inventors: Satya Vrat Gupta, Santa Clara, CA (US); Raymond F. DeMeo, Bolton, MA (US)

(73) Assignee: Virsec Systems, Inc., San Jose, CA (US)

( * ) Notice: Subject to any disclaimer, the term of this patent is extended or adjusted under 35 U.S.C. 154(b) by 1 day.

(21) Appl. No.: 14/916,066

(22) PCT Filed: Sep. 12, 2014

(86) PCT No.: PCT/US2014/055469
§ 371 (c)(1),
(2) Date: Mar. 2, 2016

(87) PCT Pub. No.: WO2015/038944
PCT Pub. Date: Mar. 19, 2015

(65) Prior Publication Data
US 2016/0212159 A1    Jul. 21, 2016

Related U.S. Application Data

(60) Provisional application No. 61/960,209, filed on Sep. 12, 2013.

(51) Int. Cl.
*H04L 29/06* (2006.01)
*G06F 21/54* (2013.01)
*G06F 21/56* (2013.01)

(52) U.S. Cl.
CPC .......... *H04L 63/1416* (2013.01); *G06F 21/54* (2013.01); *G06F 21/566* (2013.01); *H04L 63/145* (2013.01)

(58) Field of Classification Search
CPC ......... G06F 21/566; G06F 21/56; H04L 63/14
See application file for complete search history.

(56) References Cited

U.S. PATENT DOCUMENTS 4,215,406 A    7/1980  Gomola et al.
4,466,077 A    8/1984  Iannucci et al.
(Continued)

FOREIGN PATENT DOCUMENTS

EP    1 085 418    3/2001
EP    1 703 395    9/2006
(Continued)

OTHER PUBLICATIONS

International Search Report, dated Dec. 9, 2014, for International Application No. PCT/US2014/055469, entitled "Automated Runtime Detection of Malware," consisting of 4 pages.
(Continued)

*Primary Examiner* — Jason K Gee
(74) *Attorney, Agent, or Firm* — Hamilton, Brook, Smith & Reynolds, P.C.

(57) ABSTRACT

One example method and correspond apparatus extracts a model of a computer application during load time and stores the model of the computer application in a database. This example method and corresponding apparatus also inserts instructions into the computer application to collect data at runtime. This example method and corresponding apparatus then analyzes the data collected at runtime against the stored model of the computer application to detect one or more security events and tracks the one or more security events using a state machine.

115 Claims, 9 Drawing Sheets

(56) References Cited

U.S. PATENT DOCUMENTS

| | | | |
|---|---|---|---|
| 4,672,534 A | 6/1987 | Kamiya | |
| 4,751,667 A | 6/1988 | Ross | |
| 5,222,220 A | 6/1993 | Mehta | |
| 5,235,551 A | 8/1993 | Sinofsky et al. | |
| 5,359,659 A | 10/1994 | Rosenthal | |
| 5,390,309 A | 2/1995 | Onodera | |
| 5,440,723 A | 8/1995 | Arnold et al. | |
| 5,684,948 A | 11/1997 | Johnson et al. | |
| 5,826,012 A | 10/1998 | Lettvin | |
| 5,829,039 A | 10/1998 | Sugino et al. | |
| 5,850,559 A | 12/1998 | Angelo et al. | |
| 5,873,124 A | 2/1999 | Draves | |
| 5,890,005 A | 3/1999 | Lindholm | |
| 5,909,580 A | 6/1999 | Crelier et al. | |
| 5,933,594 A | 8/1999 | La Joie et al. | |
| 5,983,348 A | 11/1999 | Ji | |
| 6,151,618 A | 11/2000 | Wahbe et al. | |
| 6,240,501 B1 | 5/2001 | Hagersten | |
| 6,553,429 B1 | 4/2003 | Wentz et al. | |
| 6,775,780 B1 | 8/2004 | Muttik | |
| 6,782,478 B1 | 8/2004 | Probert | |
| 6,832,302 B1 | 12/2004 | Fetzer et al. | |
| 6,948,091 B2 | 9/2005 | Bartels et al. | |
| 6,973,577 B1 | 12/2005 | Kouznetsov | |
| 6,981,176 B2 | 12/2005 | Fruehling et al. | |
| 7,257,763 B1 | 8/2007 | Srinivasan et al. | |
| 7,260,845 B2 | 8/2007 | Kedma et al. | |
| 7,272,748 B1 | 9/2007 | Conover et al. | |
| 7,281,225 B2 | 10/2007 | Jain et al. | |
| 7,284,276 B2 | 10/2007 | Conover et al. | |
| 7,328,323 B1 | 2/2008 | Conover | |
| 7,383,166 B2 | 6/2008 | Ashar et al. | |
| 7,386,839 B1 | 6/2008 | Golender et al. | |
| 7,484,239 B1 | 1/2009 | Tester et al. | |
| 7,490,268 B2 | 2/2009 | Keromytis et al. | |
| 7,526,654 B2 | 4/2009 | Charbonneau | |
| 7,526,755 B2 | 4/2009 | De Line et al. | |
| 7,539,875 B1 | 5/2009 | Manferdelli et al. | |
| 7,555,747 B1 | 6/2009 | Agesen | |
| 7,603,704 B2 | 10/2009 | Bruening et al. | |
| 7,603,715 B2 | 10/2009 | Costa et al. | |
| 7,613,954 B2 | 11/2009 | Grey et al. | |
| 7,634,812 B2 | 12/2009 | Costa et al. | |
| 7,644,440 B2 | 1/2010 | Sinha et al. | |
| 7,730,305 B2 | 6/2010 | Eun et al. | |
| 7,747,725 B2 | 6/2010 | Williams et al. | |
| 7,895,651 B2 | 2/2011 | Brennan | |
| 7,971,044 B2 | 6/2011 | Dieffenderfer | |
| 7,971,255 B1 | 6/2011 | Kc et al. | |
| 8,042,180 B2 | 10/2011 | Gassoway | |
| 8,151,117 B2 | 4/2012 | Hicks | |
| 8,261,326 B2 | 9/2012 | Ben-Natan | |
| 8,307,191 B1 | 11/2012 | Jain | |
| 8,336,102 B2 | 12/2012 | Neystadt et al. | |
| 8,353,040 B2 | 1/2013 | Tahan et al. | |
| 8,510,596 B1* | 8/2013 | Gupta | G06F 11/073 714/15 |
| 8,954,738 B2 | 2/2015 | Asokan et al. | |
| 8,958,546 B2 | 2/2015 | Probert | |
| 8,966,312 B1 | 2/2015 | Gupta et al. | |
| 9,230,455 B2 | 1/2016 | Probert | |
| 9,418,227 B2 | 8/2016 | Franklin | |
| 2001/0013094 A1 | 8/2001 | Etoh et al. | |
| 2001/0033657 A1 | 10/2001 | Lipton et al. | |
| 2001/0047510 A1 | 11/2001 | Angel et al. | |
| 2002/0129226 A1 | 9/2002 | Eisen | |
| 2002/0138554 A1 | 9/2002 | Feigen et al. | |
| 2003/0023865 A1 | 1/2003 | Cowie et al. | |
| 2003/0028755 A1 | 2/2003 | Ohsawa et al. | |
| 2003/0033498 A1 | 2/2003 | Borman et al. | |
| 2003/0041290 A1 | 2/2003 | Peleska | |
| 2003/0079158 A1 | 4/2003 | Tower et al. | |
| 2003/0120884 A1 | 6/2003 | Koob | |
| 2003/0120885 A1 | 6/2003 | Bonola | |
| 2003/0145253 A1 | 7/2003 | de Bonet | |
| 2003/0188160 A1 | 10/2003 | Sunder et al. | |
| 2003/0188174 A1 | 10/2003 | Zisowski | |
| 2003/0191940 A1 | 10/2003 | Sinha et al. | |
| 2003/0212913 A1 | 11/2003 | Vella | |
| 2004/0049660 A1 | 3/2004 | Jeppesen et al. | |
| 2004/0103252 A1 | 5/2004 | Lee et al. | |
| 2004/0120173 A1 | 6/2004 | Regev et al. | |
| 2004/0133777 A1 | 7/2004 | Kiriansky et al. | |
| 2004/0157639 A1 | 8/2004 | Morris et al. | |
| 2004/0162861 A1 | 8/2004 | Detlefs | |
| 2004/0215755 A1 | 10/2004 | O'Neill | |
| 2004/0221120 A1 | 11/2004 | Abrashkevich et al. | |
| 2004/0268095 A1 | 12/2004 | Shpeisman et al. | |
| 2004/0268319 A1 | 12/2004 | Tousignant | |
| 2005/0010804 A1 | 1/2005 | Bruening et al. | |
| 2005/0028048 A1 | 2/2005 | New | |
| 2005/0033980 A1 | 2/2005 | Willman et al. | |
| 2005/0039178 A1 | 2/2005 | Marolia et al. | |
| 2005/0055399 A1 | 3/2005 | Savchuk | |
| 2005/0071633 A1 | 3/2005 | Rothstein | |
| 2005/0086502 A1 | 4/2005 | Rayes et al. | |
| 2005/0108562 A1 | 5/2005 | Khazan et al. | |
| 2005/0138409 A1 | 6/2005 | Sheriff et al. | |
| 2005/0144471 A1* | 6/2005 | Shupak | G06F 21/52 713/193 |
| 2005/0144532 A1 | 6/2005 | Dombrowa et al. | |
| 2005/0172115 A1 | 8/2005 | Bodorin et al. | |
| 2005/0195748 A1 | 9/2005 | Sanchez | |
| 2005/0223238 A1 | 10/2005 | Schmid et al. | |
| 2005/0273854 A1 | 12/2005 | Chess et al. | |
| 2005/0283835 A1 | 12/2005 | Lalonde et al. | |
| 2005/0289527 A1 | 12/2005 | Illowsky et al. | |
| 2006/0002385 A1 | 1/2006 | Johnsen et al. | |
| 2006/0020936 A1 | 1/2006 | Wyatt | |
| 2006/0021035 A1 | 1/2006 | Conti et al. | |
| 2006/0026311 A1 | 2/2006 | Nicolai et al. | |
| 2006/0075274 A1 | 4/2006 | Zimmer et al. | |
| 2006/0126799 A1 | 6/2006 | Burk | |
| 2006/0143707 A1 | 6/2006 | Song et al. | |
| 2006/0155905 A1 | 7/2006 | Leino et al. | |
| 2006/0161583 A1 | 7/2006 | Burka et al. | |
| 2006/0195745 A1 | 8/2006 | Keromytis et al. | |
| 2006/0212837 A1 | 9/2006 | Prasad | |
| 2006/0242703 A1 | 10/2006 | Abeni | |
| 2006/0248519 A1 | 11/2006 | Jaeger et al. | |
| 2006/0265438 A1 | 11/2006 | Shankar et al. | |
| 2006/0271725 A1 | 11/2006 | Wong | |
| 2006/0282891 A1 | 12/2006 | Pasko | |
| 2007/0016953 A1 | 1/2007 | Morris et al. | |
| 2007/0027815 A1 | 2/2007 | Sobel et al. | |
| 2007/0050848 A1 | 3/2007 | Khalid | |
| 2007/0067359 A1 | 3/2007 | Barrs et al. | |
| 2007/0118646 A1 | 5/2007 | Gassoway | |
| 2007/0136455 A1* | 6/2007 | Lee | G06F 21/564 709/223 |
| 2007/0157003 A1 | 7/2007 | Durham et al. | |
| 2007/0169075 A1 | 7/2007 | Lill et al. | |
| 2007/0174549 A1 | 7/2007 | Gyl et al. | |
| 2007/0174703 A1 | 7/2007 | Gritter et al. | |
| 2007/0192854 A1 | 8/2007 | Kelley et al. | |
| 2007/0274311 A1 | 11/2007 | Yang | |
| 2008/0215925 A1 | 9/2008 | Degenaro et al. | |
| 2008/0250496 A1 | 10/2008 | Namihira | |
| 2009/0144698 A1 | 6/2009 | Fanning et al. | |
| 2009/0217377 A1 | 8/2009 | Arbaugh et al. | |
| 2010/0005531 A1 | 1/2010 | Largman et al. | |
| 2010/0064111 A1 | 3/2010 | Kunimatsu et al. | |
| 2010/0287535 A1 | 11/2010 | Kim et al. | |
| 2012/0166878 A1 | 6/2012 | Sinha et al. | |
| 2012/0284697 A1 | 11/2012 | Choppakatla et al. | |
| 2013/0239215 A1* | 9/2013 | Kaufman | G06F 21/566 726/24 |
| 2014/0108803 A1 | 4/2014 | Probert | |
| 2014/0337639 A1 | 11/2014 | Probert | |
| 2016/0094349 A1 | 3/2016 | Probert | |

(56) References Cited

U.S. PATENT DOCUMENTS

2017/0123957 A1  5/2017  Gupta
2017/0132419 A1  5/2017  Gupta

FOREIGN PATENT DOCUMENTS

| | | |
|---|---|---|
| JP | 2003330736 A | 11/2003 |
| JP | 2004287810 A | 10/2004 |
| JP | 2005276185 A | 10/2005 |
| JP | 2009031859 A | 2/2009 |
| JP | 2011059930 A | 3/2011 |
| JP | 2014531647 A | 11/2014 |
| WO | 2010067703 A1 | 6/2010 |
| WO | WO 2015/038944 | 3/2015 |
| WO | WO 2015/200508 | 12/2015 |
| WO | WO 2015/200511 | 12/2015 |

OTHER PUBLICATIONS

Written Opinion, dated Dec. 9, 2014, for International Application No. PCT/US2014/055469, entitled "Automated Runtime Detection of Malware," consisting of 6 pages.

Howard, M., "Protecting against Pointer Subterfuge (Kinda!)," [retrieved from Internet Feb. 26, 2016] http://blogs.msdn.com/b/michael_howard/archive/2006/01/30/520200.aspx.

Lyashko, A., "Hijack Linux System Calls: Part II. Miscellaneous Character Drivers," [retrieved from Internet Feb. 26, 2016] http://syprog.blogspot.com/2011/10/hijack-linux-system-calls-part-ii.html.

"x86 Assembly Guide," University of Virginia Computer Science CS216: Program and Data Representation [retrieved from Internet Feb. 26, 2016] http://www.cs.virginia.edu/~evans/cs216/guides/x86.html (2015).

Ashcroft, K. and Engler, D., "Using Programmer-Written Compiler Extensions to Catch Security Holes," Slides presented at the Proceedings of the IEEE Symposium on Security and Privacy, Berkeley, CA, pp. 1-14, (May 2002).

Austin, T., et al., "Efficient Detection of All Pointer and Array Access Errors," Proceedings of the ACM SIGPLAN 94 Conference on Programming Language Design and Implementation, Orlando, FL (Jun. 1994).

Baratloo, A., et al., "Transparent Run-Time Defense Against Stack Smashing Attacks," Proceedings of the USENIX 2000 Annual Technical Conference, San Diego, CA (Jun. 2000).

Barrantes, E., et al., "Randomized Instruction Set Emulation to Distrupt Binary Code Injection Attacks," Proceedings of the $10^{th}$ Annual ACM Conference on Computer and Communications Security, Washington, DC (Oct. 2003).

Berger, E. and Zorn, B., "Diehard: Probabilistic Memory Safety for Unsafe Languages," Proceedings of the Programming Language Design and Implementation (PLDI), (Jun. 2006).

Bhatkar, S., et al., Address Obfuscation: An Efficient Approach to Combat a Broad Range of Memory Error Exploits, Proceedings of the $12^{th}$ USENIX Security Symposium, Washington, DC (Aug. 2003).

http://bochs.sourceforge.net, The Open Source IA-32, 59 pages, retrieved from Internet Nov. 15, 2007.

Bush, W., et al., "A Static Analyzer for Finding Dynamic Programming Errors," Software: Practice and Experience, 30(7): 775-802 (2000).

www.cert.org, Computer Emergency Response Team (CERT), 2 pages, retrieved from Internet Feb. 3, 2009.

Pyo, Changwoo and Lee, Gyungho, "Encoding Function Pointers and Memory Arrangement Checking Against Buffer Overflow Attack," $4^{th}$ International Conference Information and Communications Security (ICICS), pp. 25-36 (Dec. 2002).

Chew, M. and Song, D., "Mitigating Buffer Overflows by Operating System Randomization," (Report No. CMU-CS-02-197), Carnegie Mellon University, 11 pages. (Dec. 2002).

Chiueh, T. and Hsu, F., "RAD: A Compile-Time Solution to Buffer Overflow Attacks," Proceedings of the $21^{st}$ International Conference on Distributed Computing Systems, Pheonix, AZ, (Apr. 2001).

Cowan, C., et al.,"Stackguard: Automatic Adaptive Detection and Prevention of Buffer-Overflow Attacks," Proceedings of the $7^{th}$ USENIX Security Conference, San Antonio, TX, (Jan. 1998).

Cowan, C., et al.,"FormatGuard: Automatic Protection from Printf Format String Vulnerabilities," Proceedings of the $10^{th}$ USENIX Security Symposium, Washington, DC, (Aug. 2001 ).

Cowan, C., et al., "Protecting Systems from Stack Smashing Attacks with StackGuard," Linux Expo, Raleigh, NC (May 1999).

Cowan, C., et al.,"PointGuard™: Protecting Pointers From Buffer Overflow Vulnerabilities," Proceedings of the $12^{th}$ USENIX Security Symposium, Washington, DC, (Aug. 2003).

Dhurjati, D., et al., "Memory Safety Without Runtime Checks or Garbage Collection," Proceedings of the 2003 ACM SIGPLAN Conference on Language, Compiler, and Tool Support for Embedded Systems, San Diego, CA (Jun. 2003).

Dor, S., et al., "Cleanness Checking of String Manipulation in C Programs via Integer Analysis," Proceedings of the $8^{th}$ International Static Analysis Symposium, Paris, France, Springer LNCS 2126:194-212 (2002).

Erlingsson, U. and Schneider, F., "SASI Enforcement of Security Policies: A Retrospective," Proceedings of the New Security Paradigm Workshop, Caledon Hills, Ontario, Canada, (Sep. 1999).

Etoh, H. and Yoda, K., "Protecting from Stack-Smashing Attacks," IBM Research Division, Tokyo Research Laboratory, Jun. 2000, www.trl.ibm.com, 23 pages, retrieved from Internet Nov. 6, 2007.

Evans, D. and Larachelle D., "Improving Security Using Extensible Lightweight Static Analysis," IEEE Software, 19(1):43-51 (Jan.-Feb. 2002).

Evans, D., "Policy-Directed Code Safety," Proceedings of the IEEE Symposium on Security and Privacy, Oakland, CA, (May 1999).

Feng, H., et al., "Anomaly Detection using Call Stack Information," IEEE Security and Privacy, Oakland, CA (May 2003).

Fink G. and Bishop, M. "Property-Based Testing: A New Approach to Testing for Assurance" ACM SIGSOFT Software Engineering Notes, 22(4): 74-80 (Jul. 1997).

Forrest, S., et al., "A Sense of Self for Unix Processes," Proceedings of the IEEE Symposium on Security and Privacy, Oakland, CA, (May 1996).

Foster, J., et al., "A Theory of Type Qualifiers," Proceedings of the 1999 ACM SIGPLAN Conference on Programming Language Design and Implementation (PLDI), Atlanta, GA (May 1999).

Frantzen, M. and Shuey, M., "StackGhost: Hardware Facilitated Stack Protection," Proceedings of the 10th USENIX Security Symposium, Washington, DC, (Aug. 2001).

Ganapathy, V., et al., "Buffer Overrun Detection using Linear Programming and Static Analysis," Proceedings of the 10th ACM Conference on Computer and Communication Security, Washington D.C, (Oct. 2003).

Gaurav, S., et al., "Countering Code-Injection Attacks With Instruction-Set Randomization," Proceedings of the 10th ACM Conference on Computer and Communications Security (CCS2003), Washington, DC, (Oct. 2003).

Ghosh, A.K. and O'Connor, T., "Analyzing Programs for Vulnerability to Buffer Overrun Attacks," Proceedings of the 21st NIST-NCSC National Information Systems Security Conference, (Oct. 1998).

Goldberg, I., et al.., "A Secure Environment for Untrusted Helper Applications," Proceedings of the 6th USENIX Security Symposium, San Jose, CA, (Jul. 1996).

Grimes, R., "Preventing Buffer Overruns in C++," Dr Dobb's Journal: Software Tools for the Professional Programmer, 29(1): 49-52 (Jan. 2004).

Hastings, R. and Joyce, B., "Purify: Fast Detection of Memory Leaks and Access Errors," Proceedings of the Winter 92 USENIX Conference, San Francisco, CA, (Jan. 1992).

Haugh, E. and Bishop, M., "Testing C Programs for Buffer Overflow Vulnerabilities," Proceedings of the 10th Network and Distributed System Security Symposium (NDSS03), San Diego, CA, (Feb. 2003).

(56) References Cited

OTHER PUBLICATIONS

Jim T., et al., "Cyclone: A safe dialect of C," Proceedings of the USENIX Annual Technical Conference, Monterey, CA, (Jun. 2002).
Jones, Richard W. M. and Kelly, Paul H. J., "Backwards-Compatible Bounds Checking for Arrays and Pointers in C Programs," Proceedings of the 3rd International Workshop on Automatic Debugging, Linkoping, Sweden, 29 pages (May 1997).
Kendall, Samuel C., "Bcc: Runtime Checking for C Programs," Proceedings of the USENIX Summer 1983 Conference, Toronto, Ontario, Canada, (Jul. 1983).
Kiriansky, V., et al., "Secure Execution Via Program Shepherding," Proceedings of the 11$^{th}$ USENIX Security Symposium, San Francisco, CA, (Aug. 2002).
Phrack Magazine, "The Frame Pointer Overwriting," 55(9): 1-9 (Sep. 1999).
Krennmair, A., "ContraPolice: a libc Extension for Protecting Applications from Heap-Smashing Attacks," www.synflood.at/contrapolice, 5 pages, retrieved from Internet, Nov. 28, 2003.
Larochelle, D. and Evans, D., "Statically Detecting Likely Buffer Overflow Vulnerabilities," 2001 USENIX Security Symposium, Washington, D. C. (Aug. 2001).
Larson, E. and Austin, T., "High Coverage Detection of Input-Related Security Faults," Proceedings of the 12th USENIX Security Symposium, Washington, District of Columbia, U.S.A, (Aug. 2003).
Lams, J. R, et al., "Righting Software," IEEE Software, 21(3): 92-100 (2004).
Lee, R. B., et al., "Enlisting Hardware Architecture to Thwart Malicious Code Injection," First International Conference on Security in Pervasive Computing, LNCS vol. 2802, pp. 237-252, (2003).
Lhee, K. and Chapin, S., "Buffer Overflow and Format String Overflow Vulnerabilities," Software-Practice and Experience, 33(5): 423-460 (Apr. 2003).
Lhee, K. and Chapin, S., "Type-Assisted Dynamic Buffer Overflow Detection," Proceedings of the 11$^{th}$ USENIX Security Symposium, San Francisco, CA, (Aug. 2002).
Messier, M. and Viega, J., "Safe C String Library V1.0.3.," www.zork.org/safestr, 33 pages, retrieved from Internet, Nov. 2003.
www.metasploit.org, "Metasploit Projects,"—2 pages, retrieved from Internet Feb. 3, 2009.
Necula, G., et al., "CCured: Type-Safe Retrofitting of Legacy Code," 29th SIGPLAN-SIGACT Symposium on Principles of Programming Languages (POPL), Portland, OR, pp. 128-139 (Jan. 2002).
Nergal, "The advanced return-into-libc exploits PaX Case Study" Phrack Magazine 58(4) 30 pages (Dec. 2001).
The NX Bit. Wikipedia article, www.wikipedia.org/wiki/NXbit, 9 pages, retrieved from Internet—Feb. 3, 2009.
Oiwa, Y, et al., "Fail-Safe ANSI-C Compiler: An Approach to Making C Programs Secure," Proceedings of the International Symposium on Software Security, Tokyo, Japan, (Nov. 2002).
Ozdoganoglu, H., et al., "SmashGuard: A Hardware Solution to Prevent Security Attacks on the Function Return Address," (Report No. TR-ECE 03-13), Purdue University (2004).
The PaX project. Powerpoint presentation.
Bruce Perens, Electric Fence Malloc Debugger, www.perens.com/FreeSoftware, 10 pages, (Mar. 20, 2006).
Prasad, M. and Chiueh., T., "A Binary Rewriting Defense against Stack-Based Buffer Overflow Attacks," USENIX Technical Conference (Jun. 2003).
Prevelakis, V. and Spinellis, D., "Sandboxing Applications" Proceedings of the 2001 USENIX Annual Technical Conference (FREENIX Track), Boston, MA (Jun. 2001).
Provos, N., "Improving Host Security with System Call Policies," Proceedings of the 12$^{th}$ USENIX Security Symposium, Washington, DC, (Aug. 2003).
RATS website. Secure Software Inc., http://www.securesw.com/downloadrats.htm, retrieved from Internet 2009.
Engler, D. et al., "Checking System Rules Using System-Specific, Programmer-Written Complier Extenstions", Stanford University.

Robertson, W., "Run-time Detection of Heap-based Overflows," Proceedings of the 17$^{th}$ Large Installation Systems Administrators Conference, San Diego, CA, (Oct. 2003).
Rugina, R. and Rinard, M., "Symbolic Bounds Analysis of Pointers, Array Indices, and Accessed Memory Regions," Proceedings of the ACM SIGPLAN Conference on Programming Language Design and Implementation, Vancouver, BC, Canada, (Jun. 2000).
Ruwase, O. and Lam, M.S., "A Practical Dynamic Buffer Overflow Detector," Proceedings of the 11$^{th}$ Annual Network and Distributed System Security Symposium, San Diego, CA (Feb. 2004).
Schneider, F. B., "Enforceable Security Policies," ACM Transactions on Information and System Security, 3(1): 30-50 (Feb. 2000).
Sekar, R., et al., "A Fast Automaton-Based Method for Detecting Anomalous Program Behaviors," Proceedings of the IEEE Symposium on Security and Privacy, Oakland, CA, (May 2001).
Simon, A. and King, A., "Analyzing String Buffers in C," In Proc. Intl. Conference on Algebraic Methodology and Software Technology, LNCS 2422: 365-380 (Sep. 2002).
Simon, I., "A Comparative Analysis of Methods of Defense against Buffer Overflow Attacks," Technical report, California State Univ, 2001. [http://www.mcs.csuhayward.edu/~simon/security/boflo.html], 11 pages (Jan. 2001).
Small, C., "A Tool for Constructing Safe Extensible C++ Systems," 3$^{rd}$ USENIX Conference-Object-Oriented Technologies, Portland, OR, pp. 175-184 (Jun. 1997).
Alexander Snarskii, Freebsd libc stack integrity patch, ftp://ftp.lucky.net/pub/unix/local/ libc-letter, 5 pages (Feb. 1997).
Wojtczuk, R., "Defeating Solar Designer's Non-executable Stack Patch," http://www.openwall.com, 11 pages (Jan. 1998).
Vendicator, Stack Shield, "A 'stack smashing' technique protection tool for Linux," http://www.angelfire.com/sk/stackshield, 1 page (retrieved from Internet Feb. 2010).
Steffen, J. L., "Adding Run-Time Checking to the Portable C Compiler," Software: Practice and Experience, 22(4): 305-316 (Apr. 1992).
Suffield, A., "Bounds Checking for C and C++," Technical Report, Imperial College, 55 pages (2003).
Viega, J., et al., "ITS4: A Static Vulnerability Scanner for C and C++ Code," Proceedings of the 16$^{th}$ Annual Computer Security Applications Conference, New Orleans, LA, (Dec. 2000).
VMware Server 2, Product DataSheet; VMWare Virtual Server, http://www.vmware.com.; retrieved from Internet, Feb. 3, 2010.
Wagner, D. and Dean, D., "Intrusion Detection via Static Analysis," IEEE Symposium on Security and Privacy, Oakland, CA, pp. 156-168 (May 2001).
Wagner, D., et al., "A First Step Towards Automated Detection of Buffer Overrun Vulnerabilities," Proceedings of the Networking and Distributed System Security Symposium, San Diego, CA, (Feb. 2000).
Wahbe, R., "Efficient Software-Based Fault Isolation," Proceedings of the 14$^{th}$ ACM Symposium on Operating System Principles, Asheville, NC, (Dec. 1993).
Wheeler, David, Flawfinderwebsite, www.dwheeler.com/flawfinder/, 11 pages.
Xie, Y., et al., "ARCHER: Using Symbolic, Path-sensitive Analysis to Detect Memory Access Errors," Proceedings of the 9$^{th}$ European Software Engineering Conference, Helsinki, Finland, (2003).
Xu, J., et al., "Transparent Runtime Randomization for Security," Proceedings of the 22$^{nd}$ International Symposium on Reliable Distributed Systems (SRDS'03), Florence, Italy (Oct. 2003).
Xu, J., et al., "Architecture Support for Defending Against Buffer Overflow Attacks," *Proceedings of the Second Workshop on Evaluating and Architecting System dependability*, San Jose, CA, (Oct. 2002).
Yong, Suan Hsi and Horwitz, Susan, "Protecting C Programs from Attacks Via Invalid Pointer Dereferences," Proceedings of the 9th European Software Engineering Conference, (Sep. 2003).
Zhu, G. and Tyagi, Z., "Protection Against Indirect Overflow Attacks on Pointers," Second Intl. Workshop on Information Assurance Workshop, pp. 97-106 (Apr. 2004).
http://box3n.gumbynet.org, "How to Stop a Hacker . . . ", 2 pages.

(56) References Cited

OTHER PUBLICATIONS

International Preliminary Report on Patentability for PCT/US2014/055469 dated Mar. 15, 2016 entitled "Automated Runtime Detection of Malware".

Tanenbaum, A S., "Distributed Operating Systems," Prentice Hall, (1995), Table of Contents included only, 4 pages, Published Date: Aug. 25, 1994.

Lamport, Leslie, "Operating Time, Clocks, and the Ordering of Events in a Distributed System," Jul. 1978, Retrieved from the Internet: http://research.microsoft.com/en-us/um, pp. 558-565.

"Troubleshooting n-tier." Apr. 2011. Retrieved from Internet: http://drc.ideablade.com/xwiki/bin/view/Documentation/deploy-troubleshooting-ntier.

"Multi-tier Application Database Debugging," Jun. 2011. Visual Studio 2005. Retrieved from Internet: Dec. 5, 2016. http://msdn.microsoft.com/en-us/library/ms165059(v=vs.80).aspx.

Gravelle, R., "Debugging JavaScript: Beyond Alerts." Retrieved from Internet: Jun. 2009. http://www.webreference.com/programming/javascript/rg34/index.html.

Hunt, G. and Brubacher, D., "Detours: Binary Interception of Win32 Functions," Jul. 1999, Retrieved from the Internet: https://www.microsoft.com/en-us/research/publication/detours-binary-interception-of-win32-functions/.

Aarniala, J., "Instrumenting Java bytecode," Seminar work for the Compilers-course, Department of Computer Science University of Helsinki, Finland (Spring 2005).

Bernat, A.R. et al., "Anywhere, Any-Time Binary Instrumentation," Proceedings of the 10th ACM SIGPLAN-SIGSOFT workshop on Program analysis for software tools (PASTE). ACM, Szeged, Hungary (Sep. 2011).

Buck, B. et al., "An API for Runtime Code Patching," 20000101, vol. 14, No. 4, pp. 317-329, XP008079534, Jan. 1, 2000.

"Software Instrumentation," edited by Wah, B., Wiley Encyclopedia of Computer Science and Engineer, Wiley, pp. 1-11, XP007912827, Jan. 1, 2008.

\* cited by examiner

AUTOMATED RUNTIME DETECTION OF MALWARE

RELATED APPLICATION

This application is the U.S. National Stage of International Application No. PCT/US2014/055469, filed Sep. 12, 2014, which designates the U.S., published in English, and claims the benefit of U.S. Provisional Application No. 61/960,209, filed on Sep. 12, 2013. The entire teachings of the above applications are incorporated herein by reference.

BACKGROUND

With each passing day, cyber-attacks are becoming increasingly sophisticated. A large number of attacks are targeted to exploit specific vulnerabilities in specific applications. These attacks are not discernible at the network layer because they do not trigger network activity that appears to be overtly malicious. In order to deal with these targeted attacks, many vendors have deployed products, such as next generation firewalls which attempt to trace the behavior of the application or sandboxing technologies which attempt to run suspicious code in a sandbox and wait for the suspicious code to perform malicious activity. However, in these scenarios, malware simply adapts its behavior slightly or waits for a longer period of time to carry out its malicious intent. These changes in behavior hamper these products' ability to recognize the behavior of the attack and therefore their ability to detect the malware is greatly diminished.

SUMMARY

Computer applications, including but not limited to single and multitier, closed and distributed, standalone, web-based, and cloud-based, are vulnerable to malware attacks. The largest number of malware attacks of computer applications today result from the ability of a malicious actor to inject and later execute malicious content in a running process of a computer application. The process of injecting such malicious content involves identifying and exploiting poorly designed code that performs inadequate input validation. The current cyber security technologies attempt to either observe malicious content in the application or trace the behavior of an application or screen the behavior of suspicious code in a sandbox. These technologies do not have the capability to examine computer applications in real time at a low enough granularity to reliably detect events that indicate the injection of malicious content. In addition, these technologies do not have the capability to track and correlate such events over time in order to accurately identify these malware attacks before the malware successfully carries out its malicious intent.

One example method and corresponding apparatus extracts and stores a model of a computer application at load time. This example method and corresponding apparatus also inserts instructions into the computer application at load time in order to collect data at runtime. The data collected at runtime is analyzed against the stored model of the computer application to detect one or more security events. This example method and corresponding apparatus tracks the one or more security events triggered by an attacker using a state machine.

In some embodiments, the method and corresponding apparatus may extract as part of the model of the computer application data on one or more of the following: transition mapping data, memory mapping data, soft spot data, and/or OS functions or system calls that affect access permissions and privileges referenced by the computer application. Such information may be saved in a model database. Furthermore, the method and corresponding apparatus may extract the model of the computer application at least in part using a code disassembler. The computer application being extracted may be in various formats including binary format or interpreted format.

In example embodiments, the method and corresponding apparatus may check the computer application for integrity during load time. The method and corresponding apparatus may check the computer application for integrity by computing a checksum such as the MD5 hash of the code or using a trusted checksum verification service.

In some embodiments, the model database contains one or more tables for modeling the computer application. Furthermore, the model database may be on a local or remote system. If the model database is on a remote system, the method and corresponding apparatus may package the model of the computer application for transmission to the remote system for storing in the database. The packaged model of the database may be transmitted using a standards based transport protocol such as TCP/IP or UDP.

In example embodiments, the method and corresponding apparatus inserts instrumentation instructions at load time into the computer application using a dynamic binary analysis engine or a byte code instrumentation engine. When the instrumented application runs, the data collected at runtime may be packaged for transmission to another process for analyzing. This other process for analyzing may be on a local or a remote system. Furthermore, the data collected at runtime may comprise data for one or more threads of the computer application.

In some embodiments, when analyzing the data collected at runtime against the stored model of the computer application, the method and correspond apparatus may analyze one or more of the following: transition data, Critical OS functions and system calls that affect access permissions and privileges, memory writes, heap allocation or de-allocation, and/or soft spot data.

In example embodiments, tracking the one or more security events using a state machine comprises correlating the events based on a predefined sequence. Tracking the one or more security events may also include capturing forensic data for the events. In an embodiment, the one or more security events may be tracked using severity levels. Furthermore, one or more actions may be taken in response to the occurrence of one or more security events. In one example embodiment, the one or more actions in response to an event are automatically taken by the system, and in another example embodiment, the one or more actions can be taken after manual intervention by the user. In some embodiments, the one or more actions may include one or more of the following: terminating one or more threads of the computer application, closing a communication socket on one or more threads of the computer application, terminating the application, recording the event, and/or generating alerts in response to the one or more security events.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 depicts an example configuration of an advanced persistent malware threat.

DETAILED DESCRIPTION

A description of example embodiments of the invention follows.

The teachings of all patents, published applications and references cited herein are incorporated by reference in their entirety.

Figure 1:
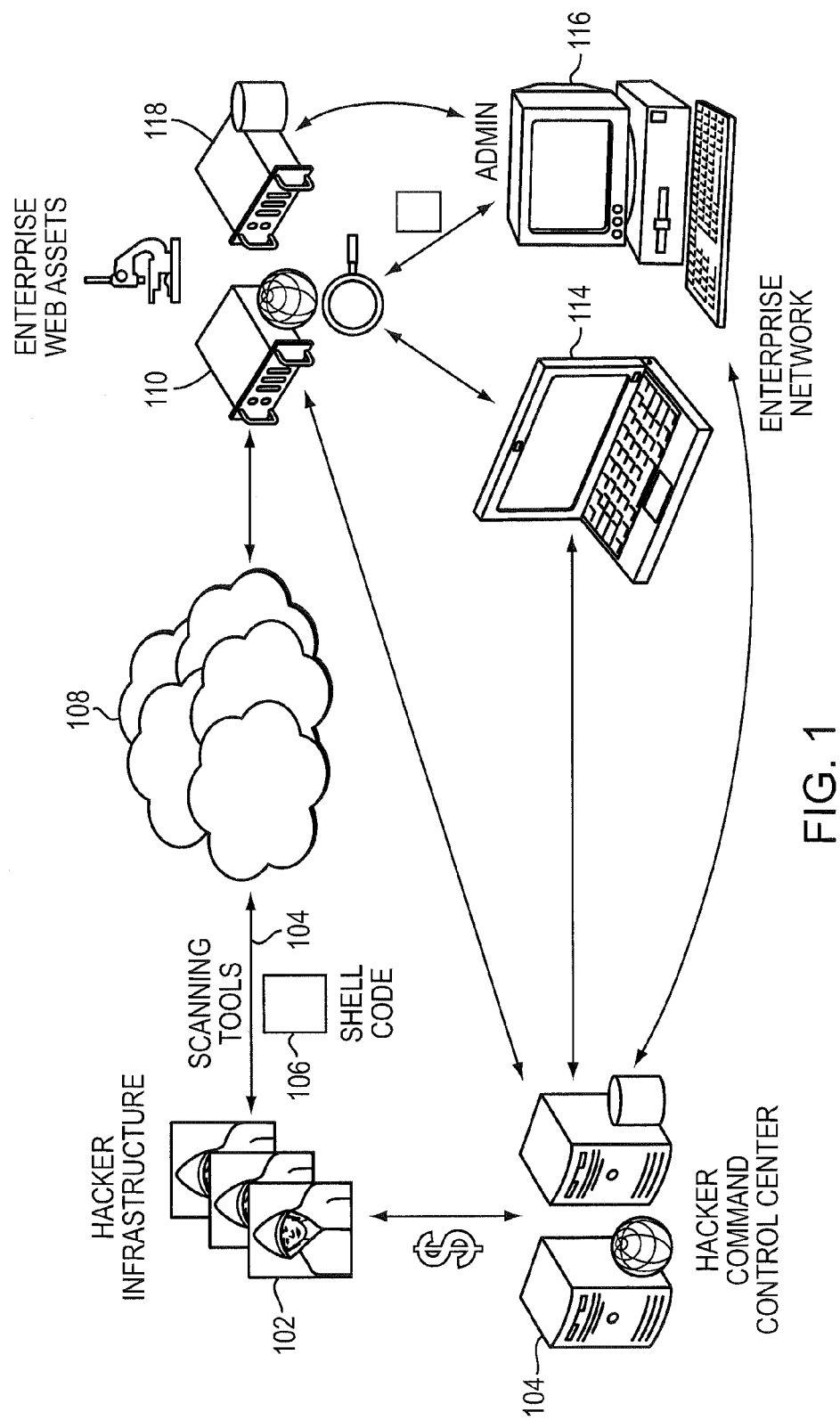

FIG. 1 represents an example of an advance persistent malware threat. In this scenario, a malicious actor (or hacker) from the actor's own infrastructure 102 remotely scans the web facing the infrastructure of an enterprise 108 using scanning tools such as nmap 104. When the scan finds a server that has either a known vulnerability or zero-day vulnerability, the actor installs shell code 106 to gain control of the remote enterprise server 110 and access the enterprise network. Once inside the network, the malicious actor loads additional tools 104. These tools may include nmap, port scanners, password cracking tools, ftp client, compression tools, hashing, and/or encryption and decryption tools.

The actor then accesses the enterprise infrastructure looking for a machine 114 or 116 from which elevated privileged users log into valuable targets such as databases and file repositories for the purposes of scraping the access credentials of the user and for finding a home for more hacking tools. Upon finding a machine with vulnerable applications 114 or 116, the malicious actor can scrape for credentials, infiltrate and subsequently access the target 118. Once the target is accessed, additional tools of the trade are loaded onto the target 104. Malware can also be deposited onto mobile devices such as smartphones and laptops of privileged users as they take their machines through unprotected networks such as coffee shops, airports, and hotels. In another scenario, an inside user may infect target machines.

By using sophisticated password cracking tools or snooping intranet traffic, the malware can obtain the credentials of the administrative user 116. After credentials have been obtained, the malicious actor can connect to the databases and file repositories 118 with impunity and extract valuable data such as real names, home addresses, social security, driver licenses, birth dates, medical records, financial information such as credit/debit cards, phone numbers, email addresses, user names and passwords, and insurance information. The malicious actor can optionally compress and encrypt this information and upload it to the Hacker Command Control Center 112 in small chunks so as to not draw attention of the enterprise security analysts. To achieve this objective, the malicious actor changes the IP addresses of the Hacker Command Control Center 112 on a daily basis or uses proxies so that intrusion detection systems in the enterprise cannot establish a pattern. An enterprise typically sends and receives over 10 GB of data every day; therefore uploading relatively small amounts of data in short bursts often goes unnoticed.

Being able to detect and block the chain of events for this type of scenario reliably is the key to thwarting such advanced persistent threats. Contemporary cyber security tools suffer from four major shortcomings. First, these tools do not examine the application at a low enough granularity. Without this capability, many signs of attacks cannot be discerned reliably. Next, these tools do not have the capability to track the attack over time. The typical security information and event management (SIEM) systems only correlate events (that are of too high a granularity) for typically 24 hours. Malware can simply lie dormant for a long enough period of time to escape detection. Without the capability to track the attack reliably over time, the individual malicious events contributing to the attack appear as disjoint un-correlated events.

In addition, these cyber security tools depend on security analysts to set the threshold of events that signify an attack. For example, one security analyst may have internalized that some number of port scans and login attempts per hour will occur in the normal course of the day. The question becomes how many port scan attempts per source per hour are one too many before an alert is triggered. If an alert is generated too early, an analyst may be investigating port scans with no malicious intent or failed logins by legitimate users. If an alert is raised too late, then the malware attack may have already succeeded. Furthermore, these tools have an incomplete knowledge base to effectively detect the attack. The ability to generate truly genuine alerts requires the tools to distinguish between benign and malicious events reliably. A malicious actor would be aware of the same signatures or known suspicious network or application behaviors. Therefore, the malicious actor can tweak the behavior of the attack, such as using encryption to encode the data, changing IP and port combinations, or by slowing down the attack so as to avoid detection based on the behavior specified in the knowledge base.

Figure 2:
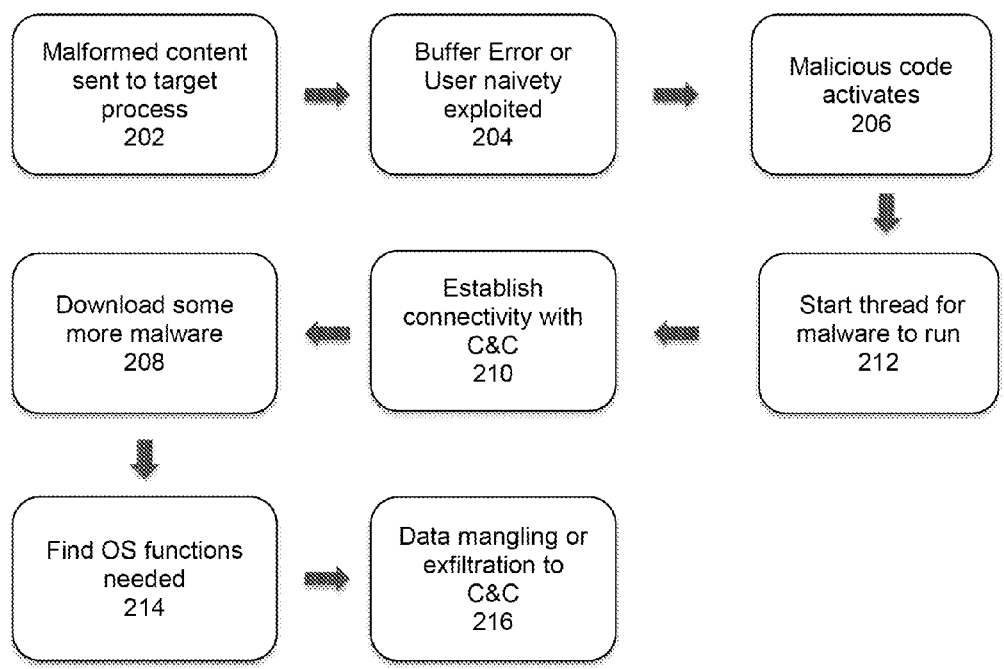
FIG. 2 shows an example chain of immutable events indicating a code execution style attack.

FIG. 2 shows a chain of immutable events depicting a code execution attack. For various malware attacks, such as code execution attacks, a corresponding event chain of the malware attack can be represented by a series of immutable events. These events can be stored in the process memory of a computer for tracking specific malware attacks. The following scenario describes the behavior represented by the series of immutable events at 202-216 of a code execution attack.

In executing a code execution attack, once a malicious actor locates an unpatched application or a so-called 0-day vulnerability, the actor can compose a specially crafted payload of malformed content. This payload is then sent directly or through a network to a target process at 202 running on the central processing unit (CPU) of a computer system to divert the CPU from calling the instructions of a computer application and instead calls instructions at the behest of the malicious payload. This specially crafted payload can be injected into the application through many mechanisms, such as over a network socket, through the keyboard, or even through a file, depending on the application being targeted.

To activate the malicious payload injected during the attack at 206, the malware can leverage one of many attack vectors. In the case of the code execution attack, the malware exploits a buffer error or user naivety at 204. Other examples of attacks vectors include the simplistic Stack Smashing approach, using format specifiers, finding the pseudo random stack canary, over running the exception handler tables, or Return Oriented Programming (ROP) gadgets as well as many additional vectors.

Before commencing its full blown malicious activity, the malware can hibernate for a sufficiently long period of time so that detection techniques can be subverted. For example sandbox techniques that inspect emails for suspicious activity must eventually give up and deliver the email to the recipient. At some later point in time, the malware can use either an existing application thread or spin one or more new threads at 212 to start executing its intent. In some cases, using an existing thread may attract user attention and spinning new ones may go unnoticed. This is because most security solutions do not have the ability to determine if spinning a new thread is malicious or benign activity. Having now created a wedge in the application, the malware establishes connectivity with the malicious actor's Command Control Center (C&C) at 210. Once connectivity from inside the enterprise firewall is established, the thread on which malware can download more malware at 208 such as password cracking tools, port scanning tools, encryption tools etc. in bits and pieces so as to not attract attention of file blacklisting solution.

Once the tools are downloaded, the malware looks to extract useful content from the infected machine and all other machines reachable from the infected machine. In the code execution attack in FIG. 2, the malware may keep searching the enterprise until it finds a user with elevated privileges. Alternatively, it could sniff traffic, such as SMB/NETBIOS/CIFS traffic, in the enterprise to find privileged users' user names and login credentials. Alternatively, it could use password cracking tools or simply compare the hash of guess passwords with contents of password files. With today's processing power, an 8 character long password can be cracked in a few hours.

After the privileged user's credentials have been extracted, the malware is adequately armed and can go about its business of extracting useful content from the infected machine and all other machines reachable from the infected machines. The list of reachable machines may include database servers, code repositories, or CAD machines with valuable design documents. Once the valuable content has been extracted, the malware may encrypt data or upload data to the Command Control Center at 216 before the attack is culminated. If data is encrypted, the malicious actor may contact the target with a ransom request.

Figure 3:
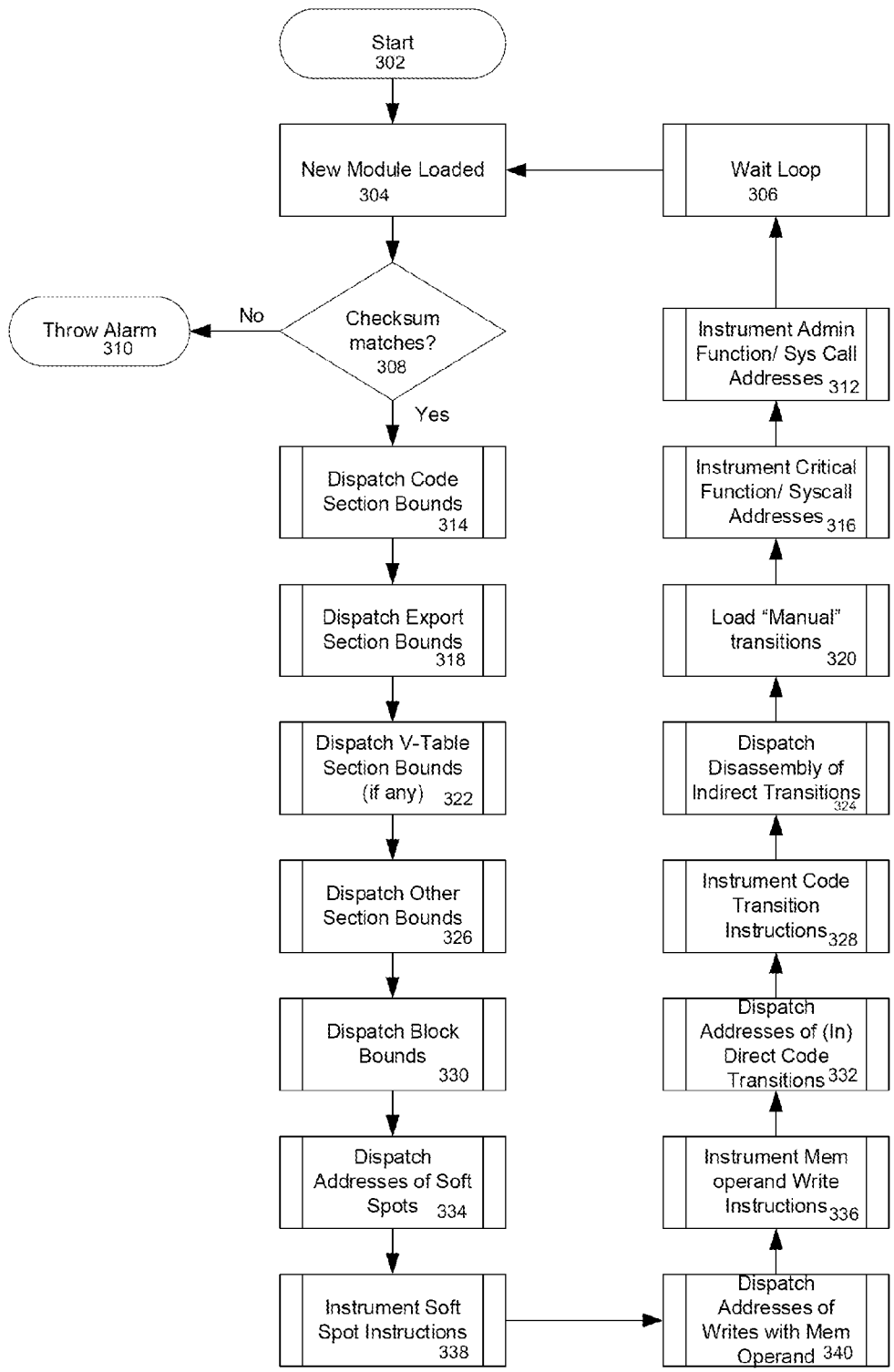
FIG. 3 shows an example flow chart of load time operations executed by a client.
Figure 4:
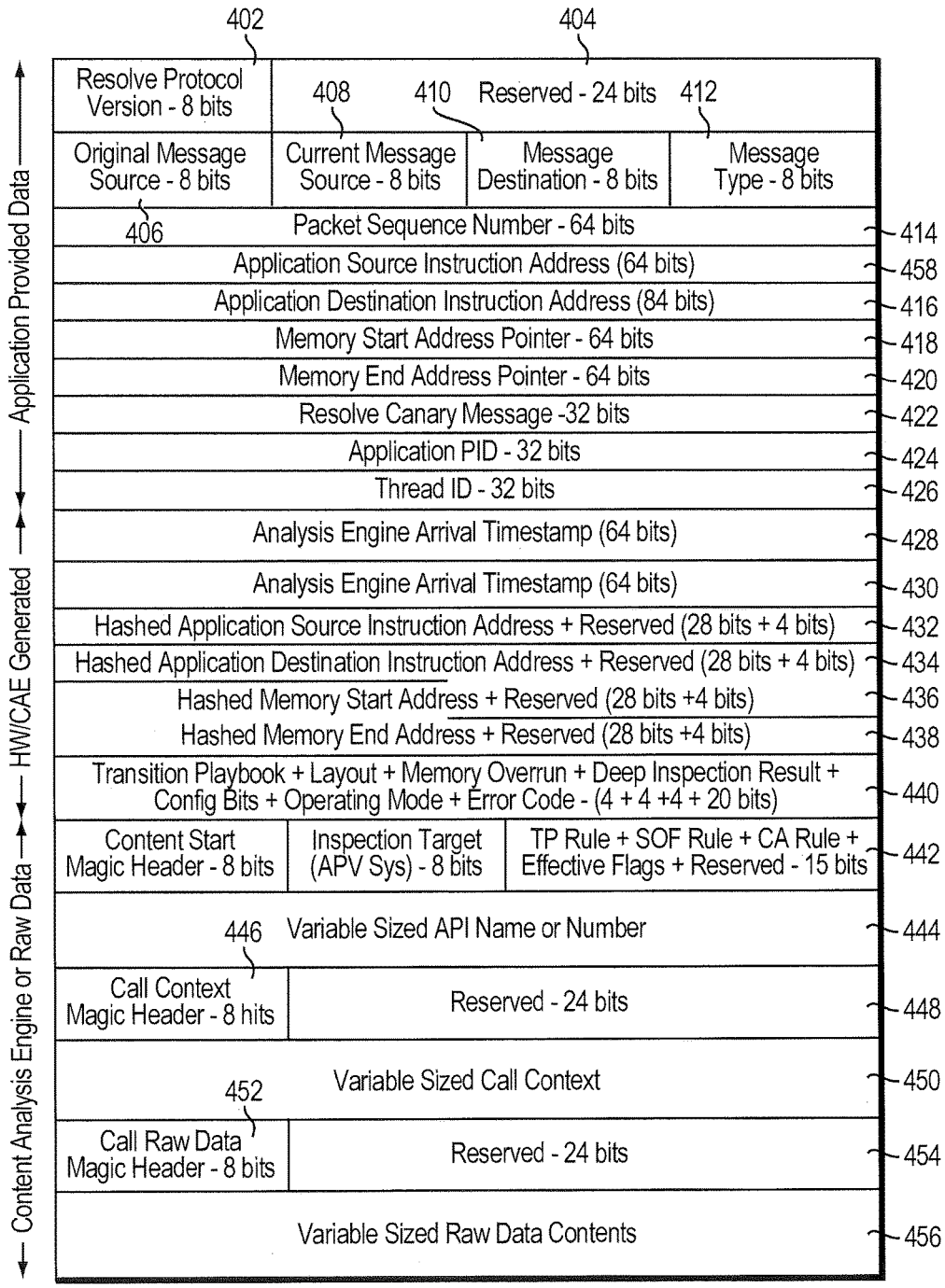
FIG. 4 depicts an example protocol data unit (PDU) used to transmit data between the client and an analysis engine.

FIG. 3 shows the operations that an example client referred to herein as the Resolve Client performs at load time to prepare for detecting malware activity, in accordance with principles of the present disclosure. The Path Validation Engine is part of the Resolve Client that can reliably detect malware activity within microseconds from the point the malware starts to run. The Resolve Client first verifies the integrity and then analyzes each module of the application in order to extract a model of the application. The model of the application is stored in an Application Map Database that may contain the following tables: Code Table, Export Table, V Table, Other Table, Basic Block Table, Soft Spot Table, Memory Operand Table, Transition Table, Disassembly Table, and Critical OS Functions Table. In the embodiment in FIG. 3, the Application Map Database is located on a remote system from the Resolve Client. In other embodiments, the Application Map Database can be saved on the same hardware where the application is executing or on hardware external to both the Resolve Client and Analysis Engine. The Resolve Client uses a Streaming Engine to package the extracted model of the application into Resolve Protocol Data Units (PDUs) to dispatch the data to be stored in the Application Map Database on the analysis system. The PDU structure is shown in FIG. 4.

After the Resolve Client starts processing the application at load time at 302, the same operations are performed in a loop for each module of the computer application at 304 and 306. As each module of the application loads in memory, the Resolve Client examines all the executables and libraries of the given module using a disassembler such as a machine code or a byte code disassembler. The modules of the application file are in a standard file format, such as Executable and Linkable Format (ELF) or Common Object File Format (COFF). In this format, the modules of the application are organized into sections that include a code section, exported data section, v-table section, and other additional sections. As each module of the application loads in memory, the Resolve Client extracts these data sections as part of the model of the application. The bounds and access attributes of the code section of the module are dispatched and saved to the Application Map Database in the Code Table at 314. Each record in this table is of the form {Start Address, End Address}. The bounds and number of instructions of each basic block in the code section of the module are dispatched and saved in the Application Map database in the Basic Block Table at 330. Each record in this table is of the form {Start Address, End Address, and Number of instructions}. The bounds and access attributes of the exported data section of the module are saved in the Application Map database in the Export Table at 318. Each record in this table is of the form {Start Address, End Address}. The bounds and access attributes of a v-table section (if any) of the module are dispatched and saved in the Application Map database in the V Table at 322. Each record in this table is of the form {Start Address, End Address}. The bounds and access attributes of all other sections of the module are dispatched and saved in the Application Map database in the Other Table at 326. Each record in this table is of the form {Start Address, End Address, and Protection Attributes}.

As each module loads into memory, the Resolve Client also extracts other memory mapping data and soft spot data from the modules of the application. Memory mapping data includes instructions for memory allocation, memory de-allocation, and memory writes to critical segments of memory. Soft spot data includes instructions for manipulating large memory buffers (spot spots) including instructions that execute loops (such as instructions with REP style opcodes). The address of soft spot instructions and the size of each memory write are dispatched and saved in the Application Map database in the Soft Spot Table at 334. Each record in this table is of the form {Address, Write size}. The address and the write size will be stored for memory write instructions where the destination is a memory operand. This data is stored in the Application Map Database in the Memory Operand Write Table at 340. Each record in this table is of the form {Source Address, Memory Write Size}.

As each module of the application loads into memory, the Resolve Client also extracts transition mapping data (branch transfer or transition data) from the module. The transition mapping data can be for a direct transition mapping where transition instructions for the target address can be presently determined or for an indirect memory mapping where transition instructions for the target address have run time dependency preventing these instructions from being fully determined until runtime. The full disassembly of instructions where indirect transitions occur are dispatched and saved in the Application Map Database in the Disassembly Table at 324. All the extracted transition mappings are also dispatched and saved in the Application Map Database in the Transition Table at 324 and 332. Each record in this table is of the form {Source Address, Destination Address}. In addition, an operator can manually add Transition Mapping Data into the Map Transition Table prior to runtime at 320. In order to add records manually into the Map Transition Table, an operator may be required to authenticate themselves using a 2-factor authentication process to eliminate possible tampering of the Transition Table by malware.

Transition mapping is central to the ability of the Path Validation Engine to reliably detect malware activity within microseconds from the point that the malware starts to run. The concept of transition mapping can be better understood by an examination of source code. In the following sample source code, the function main( ) makes a call to the function printf( ) which is defined in a library, but does not make a call to function notCalled( ). After a compiler and linker have run through this code and the binary produced is examined, the inter-relationships or lack thereof between the functions main( ), printf( ) and notCalled( ) is preserved. The function main( ) is said to have a "transition" to the function printf( ) which can be expressed as $\{Address_{SRC} \rightarrow Address_{DST}\}$ where $Address_{SRC}$ is the address of the instruction where the function printf( ) is called in the function main( ) and $Address_{DST}$ is the address of the function printf( ). The source and target could be a system call or an exception handler. A record such as the above is a single record in the application's Transition Map Table.

```
//C hello world example
#include <stdio.h>
int main( )
{
printf("Hello world\n");
return 0;
}
int notCalled( )
{
printf("Feeling lonely !\n");
return 0;
}
```

While the above example is written in C/C++ which is a compiled language, this analogy between transitions in source code can be envisioned in code written in any other language, including interpreted or JIT compiled code. The same example is shown in an interpreted language like Java as shown below.

```
/*
Java Hello World example.
*/
public class HelloWorldExample {
    public static void main(String args[ ]){
       System.out.println("Hello World !");
    }
```

```
    public static void notCalled( ) {
       System.out.println("Feeling lonely !");
    }
}
```

As each module of the application loads into memory, the Resolve Client also checks the application for integrity at 308. In one embodiment, this is accomplished by computing a checksum such as the MD5 hash of the code as it is loading and comparing it against its corresponding known good checksum saved in a Checksum database. Alternatively, a trusted checksum verification service can also be leveraged. This ensures that the code of the currently loading module is not already corrupted with malware. The Resolve Client may be configured to throw an alarm if the integrity check fails at 310.

At load time, particular OS functions and system calls that affect access permissions and privileges are also identified and their addresses are dispatched and saved in the Critical OS Functions Table at 312 and 316. The particular OS functions and system calls dispatched by the Resolve client have long reaching effects on the execution path of the executable. These administrative and critical OS functions and system calls change access permissions of memory segments, bump up access privileges, changes the no-execute policy, changes the Structured Exception Handler protection, shuts down the Address Space Layout Randomization policy, allocated and de-allocates memory, creates a new process, creates a new thread, or are involved in encrypting and decrypting data.

As each module of the application loads into memory, the Resolve Client additionally instruments instructions that are inserted into the module of the application to collect data at runtime. The instrumented code is inserted into the modules of the application using a dynamic binary analysis engine and/or a byte code instrumentation engine. Soft spot instructions are instrumented in areas within the modules that malware tend to attack, such as instructions that execute loops, to collect data to track activities in these areas at runtime at 338. Direct and indirect transition mapping instructions are instrumented in the modules to collect data to track activities involving transition mappings at runtime at 328. Memory Operand Write instructions are instrumented in the modules to collect data on memory write activities at runtime at 336. In the presence of self-modifying code, the basic blocks may change at run time. Additionally, instructions are instrumented in the application to collect data for activities involving OS functions and systems calls stored in the Critical OS Function Table at 312 and 316.

As a result of the instrumentation inserted at load time, critical information is generated at run time and collected for analysis. As the transition mapping data related instrumentation is accessed, the Resolve Client collects the thread ID, current instruction address, destination instruction address and optionally data contained in each general purpose register. As the Soft Spot instrumentation is accessed before the instruction is executed, the Resolve Client captures the thread ID and the bounds of the stack through appropriate registers. As the soft spot instrumentation is completed, the Resolve Client captures the thread ID and a few general purpose registers that allow it to estimate the region of memory updated by this write operation. As the critical API or OS call instrumentation is accessed before the call is executed, the Resolve Client captures the thread ID, API name or System Call number and input parameters. As the critical API or OS call instrumentation is accessed after the call is executed, the Resolve Client captures the thread ID, API name or System Call number and return value. Instrumentation in the OS functions or system calls that allocate or de-allocate memory helps to track the regions of memory that are currently involved in the various heaps the application may have created. This memory envelop is leveraged to track the target of indirect memory writes run time in order to find if the malware wants to overrun control structures in the heap. In addition, by tracking the bounds of basic blocks using a cache, the Analysis Engine can determine if the basic block has changed. When the determination is positive, the Basic Block Table in the model database can be updated.

In this example embodiment, the Resolve Client then dispatches the captured information to a Streaming Engine to be packaged into a PDU for transmission to the Analysis Engine. The Streaming Engine uses a very low overhead OS artifact such as pipes or local procedure calls to move the data generated by the various instrumentation to another process so that the instrumented process can continue its normal course of operation. As in this example embodiment, the Streaming Engine can also package the information collected from the instrumentation into a Resolve PDU for further transmission to the Analysis Engine using an appropriate standards based transport protocol. In one embodiment, the transport protocol may be TCP/IP. In another embodiment, it may be UDP. In yet another embodiment the transport protocol may involve using shared memory technologies such as pipes or local procedure calls.

FIG. 4 depicts the Resolve PDU. In order for the Resolve Client and the Analysis Engine to work effectively with each other, they communicate with each other using the Resolve PDU. The Resolve PDU can specifically be used by the Resolve Client to package the extracted model of the application and/or collected runtime data for transmission to the Analysis Engine. The Resolve PDU contains fields for each type of information to be transmitted between the Resolve Client and the Analysis Engine. The Resolve PDU is divided into the Application Provided Data Section, the HW/CAE Generated, and Content Analysis Engine or Raw Data sections.

The Application Provided Data Section contains data from various registers as well as source and target addresses that are placed in the various fields of this section. The Protocol Version contains the version number of the Resolve PDU 402. As the Resolve protocol version changes over time, the source and destination must be capable of continuing to communicate with each other. This 8 bit field describes the version number of the Resolve packet as generated by the source entity. A presently unused reserved field 404 follows the Protocol Version field.

Figure 7:
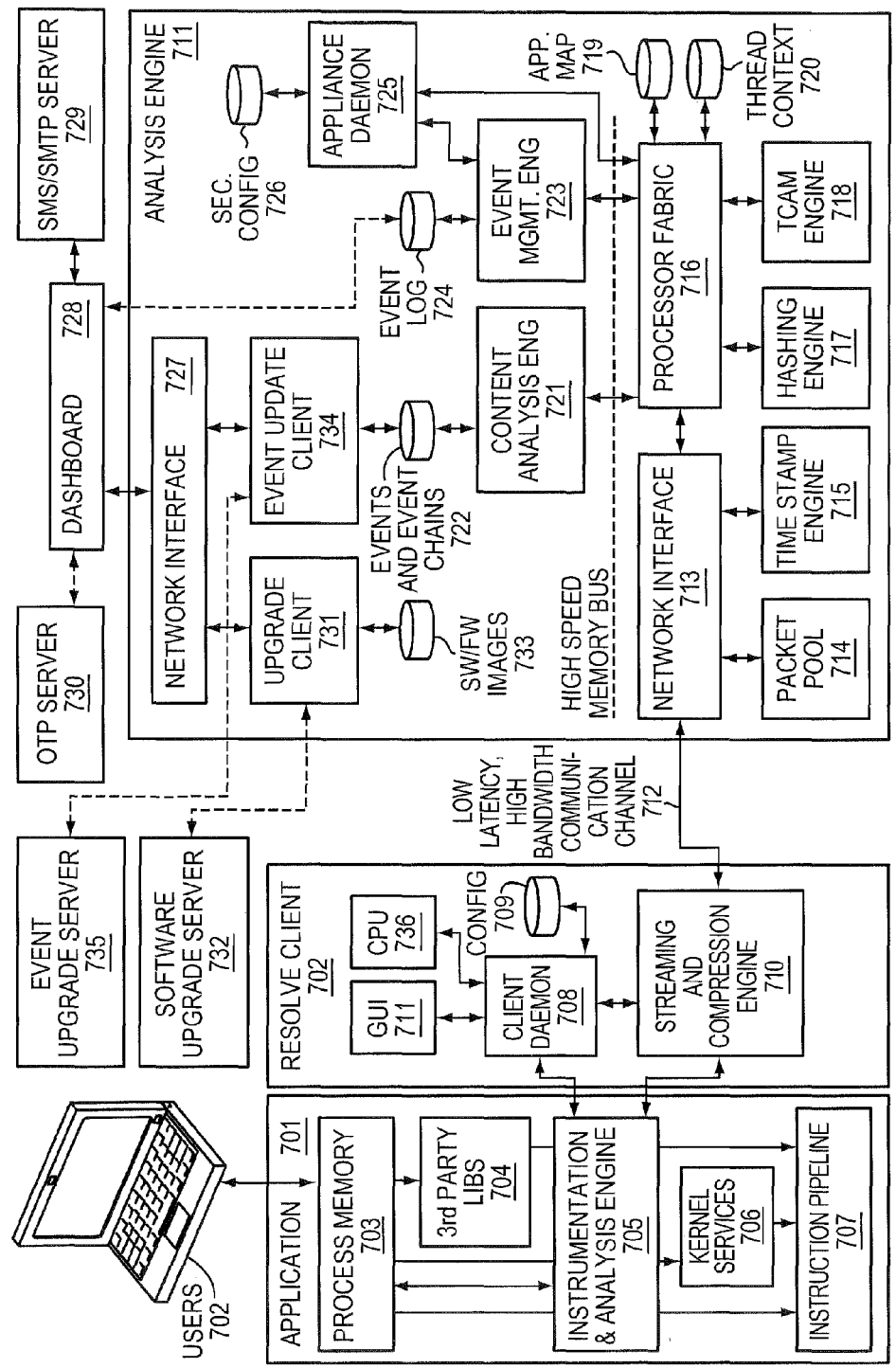
FIG. 7 depicts an example block diagram of the client and analysis engine.

The next field of the Application Provided Data Section is the Message Source/Destination Identifiers 406, 408, and 410 are used to exchange traffic within the Analysis Engine infrastructure as shown in FIG. 7. From time to time, the various entities shown in FIG. 7, exchange traffic between themselves. Not all these devices have or need IP addresses and therefore, the two (hardware and host) Query Router Engines uses the Message Source and Destination fields to route traffic internally. Some messages need to go across the network to entities in the Analysis Engine. For this purpose, the entities are assigned the following IDs. A given Analysis Engine appliance may have more than one accelerator card. Each card will have a unique IP address; therefore, the various entities will have a unique ID. The aforementioned infrastructure may also be running more than one application. Since each application server will have a unique IP address, the corresponding Resolve client side entity will also have a unique ID.

Resolve Client Side Entities
1. Resolve GUI
2. Instrumentation and Analysis Engine
3. Client Message Router
4. Streaming Engine
5. Client Side Daemon
6. CLI Engine
7. Client Watchdog
8. Client Compression Block
9. Client iWarp Ethernet Driver (100 Mb/1 Gb/10 Gb)
Per PCI Card Entities (Starting Address=20+n*20)
20. Securalyzer TOE block
21. Securalyzer PCI Bridge
22. Decompression Block
23. Message Verification Block
24. Packet Hashing Block
25. Time-Stamping Block
26. Message Timeout Timer Block
27. Statistics Counter Block
28. Securalyzer Query Router Engine
29. Securalyzer Assist
Securalyzer Host Entities
200. Securalyzer PCIe Driver
201. Host Routing Engine
202. Content Analysis Engine
203. Log Manager
204. Daemon
205. Web Service Engine
206. Watchdog
207. IPC Messaging Bus
208. Configuration Database
209. Log Database
SIEM Connectors
220. SIEM Connector 1—Virsec Dashboard
221. SIEM Connector 2—HP ArcSight
222. SIEM Connector 3—IBM QRadar
223. SIEM Connector 4—Alien Vault USM
Securalyzer Infrastructure Entities
230. Virsec dashboard
231. SMTP Server
232. LDAP Server
233. SMS Server
234. Entitlement Server
235. Database Backup Server
236. OTP Client
237. OTP Server
238. Checksum Server
239. Ticketing Server
240. Virsec Rules Server
241. Virsec Update Server
All User Applications
255. User Applications—Application PID is used to identify the application issuing a query Another field of the Application Provided Data section is the Message Type field which indicates the type of data being transmitted 412. At the highest level, there are three distinct types of messages that flow between the various local Resolve client side entities, between the Analysis Engine appliance side entities and between Client side and appliance side entities. Furthermore, messages that need to travel over a network must conform to the OSI model and other protocols.

The following field of the Application Provided Data section is the Packet Sequence Number field containing the sequence identifier for the packet 414. The Streaming Engine will perform error recovery on lost packets. For this purpose it needs to identify the packet uniquely. An incrementing signed 64 bit packet sequence number is inserted by the Streaming Engine and simply passes through the remaining Analysis Engine infrastructure. If the sequence number wraps at the 64 bit boundary, it may restart at 0. In the case of non-application packets such as heartbeat or log message etc., the packet sequence number may be −1.

The Application Provided Data section also contains the Resolve Canary Message field contains a canary used for encryption purposes 422. The Resolve Client and the Analysis Engine know how to compute the Canary from some common information but of a fresh nature such as the Application Launch time, PID, the license string, and an authorized user name.

The Application Provided Data section additionally contains generic fields that are used in all messages. The Application Source Instruction Address 458, Application Destination Instruction Address 416, Memory Start Address Pointer 418, Memory End Address Pointer 420, Application PID 424, Thread ID 426, Analysis Engine Arrival Timestamp 428, and Analysis Engine Departure Timestamp 430 fields which hold general application data.

The Resolve PDU also contains the HW/CAE Generated section. In order to facilitate analysis and to maintain a fixed time budget, the Analysis Engine hashes the source and destination address fields and updates the Resolve PDU prior to processing. The HW/CAE Generated section of the Resolve PDU is where the hashed data is placed for later use. This section includes the Hashed Application Source Instruction Address 432, Hash Application Destination Instruction Address 434, Hashed Memory Start Address 436, and Hashed Memory End Address 438 fields. The HW/CAW Generated section additionally contains other fields related to the Resolve Canary 442 including the Hardcoded Content Start Magic header, API Name Magic Header, Call Context Magic Header and Call Raw Data Magic Header are present in all Resolve PDU packets.

The HW/CAW Generated section also includes a field 440 to identify other configuration and error data which includes Result, Configuration Bits, Operating Mode, Error Code, and Operating Modes data. The Result part of the field is segmented to return Boolean results for the different Analysis Engine queries—the transition playbook, the code layout, the Memory (Stack or Heap) Overrun, and the Deep Inspection queries. The Configuration Bits part of the field indicates when a Compression Flag, Demo Flag, or Co-located Flag is set. The presence of the flag in this field indicates to the Analysis Engine whether the packet should be returned in compression mode. The Demo Flag indicates that system is in demo mode because there is no valid license for the system. In this mode, logs and events will not be available in their entirety. The Co-located Flag indicates that the application is being run in the Analysis Engine so that Host Query Router Engine can determine where to send packets that need to return to the Application. If this flag is set, the packets are sent via the PCI Bridge, otherwise they are sent over the Ethernet interface on the PCI card. The Operating Mode part of the field indicates whether the system is in Paranoid, Monitor, or Learn mode. These modes will be discussed in more details later in this section. Lastly, the Error Code part of the field indicates an error in the system. The first eight bits of the error code will correspond to the message source. The remaining 12 bits will correspond to the actual error reported by each subsystem.

The Resolve PDU also contains the Content Analysis Engine or Raw Data. All variable data such as arguments and return value of the OS library calls and System Calls is placed in this section of the Resolve PDU. The data in this section contains the content of the data collected from the application and is primarily targeted at the Content Analysis Engine. This section contains the Variable Sized API Name or Number 444, the Call Content Magic Header 446, the Variable Sized Call Content 450, the Call Raw Data Magic Header 452, Variable Sized Raw Data Contents 456, and two reserved 448 and 454 fields. Furthermore, these fields can be overloaded for management messages.

Figure 5:
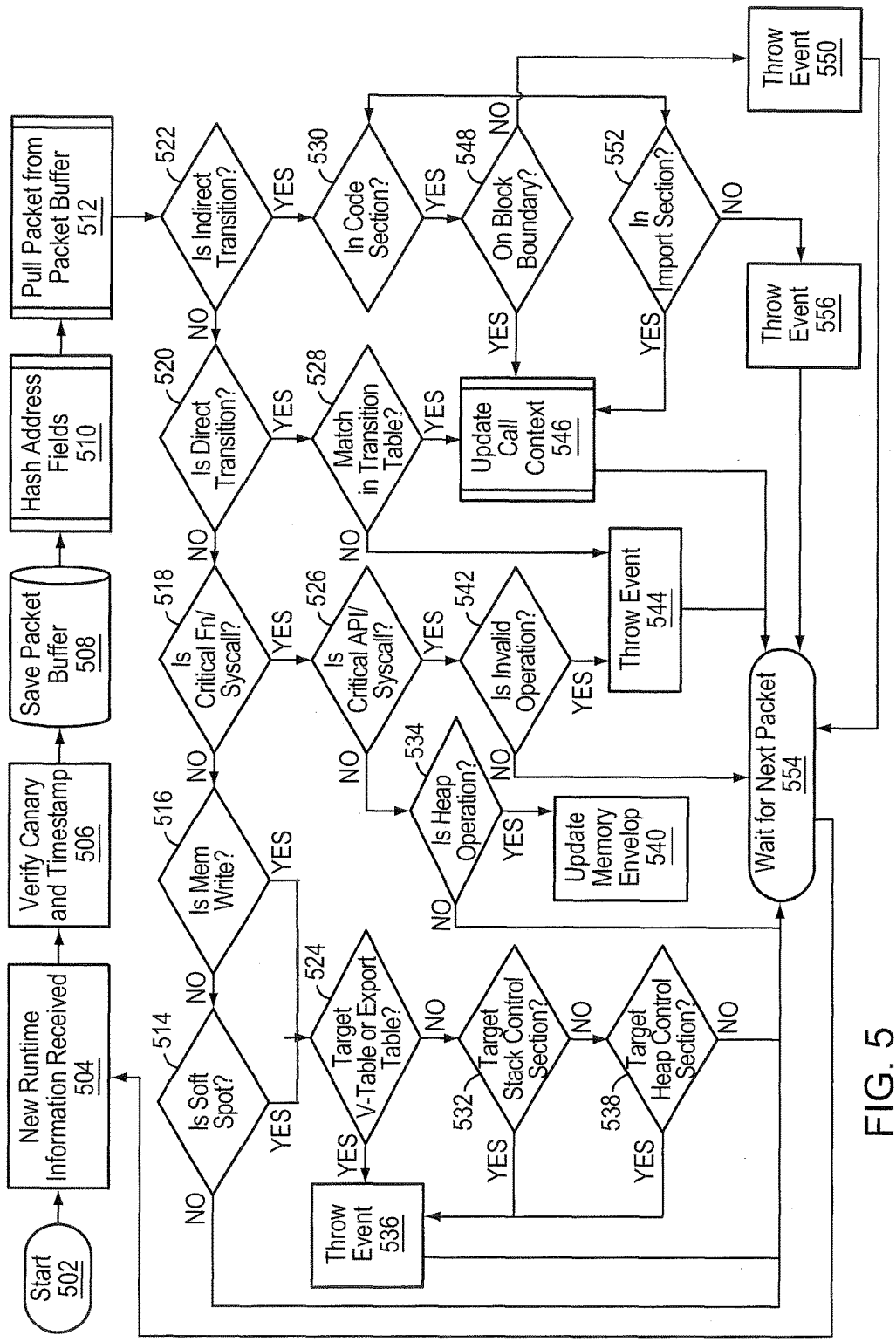
FIG. 5 shows an example flow chart of a process used by the analysis engine to generate events based on data collected at runtime.

FIG. 5 shows the process used by Analysis Engine to detect security events at runtime. In this example embodiment, the Analysis Engine is a separate process running on the same or different hardware relative to the Resolve Client. By separating the data collection from the data analysis part, the processing overheads associated with the analysis of information generated by the instrumentation process is substantially reduced. This allows the Analysis Engine to perform runtime analysis for multiple applications at the same time.

During run time, instrumentation on the code provides an opportunity to examine the appropriate context, such as thread ID, stack start and base addresses, general purpose registers, source addresses, and destination addresses. The sequence of operations for examining the content has no specific order, is interchangeable, and can even be performed in parallel by multiple threads of the Analysis Engine. Using the process described in FIG. 5, the Secure Engine will generate individual events for each thread in the application that can be collected on a specific and individual Event Chain State Machine to track the progression of the attack in real time. The events generated by the Analysis Engine follow a standards based event format, such as SYSLOG. This enables a standards based event management system to use the events generated by the Resolve Client either directly or through a connector that translates SYSLOG to a standard target format, such as Common Event Format (CEF). Since the Analysis Engine has access to the previously saved Application Map with all its tables, when a performed transition instruction reports its context, the Analysis Engine has access to the extracted model of the application, including data indicating whether or not a target address is a valid destination.

After the process starts at 502, new runtime information is received in a Resolve PDU packet from the Resolve Client at 504. Before saving the packet in a buffer at 508, the Analysis Engine verifies the canary and timestamp contained in the packet at 506. While the Resolve PDU is still buffered, the Analysis Engine hashes the address fields and puts the hashed data in the HW/CAE section of the Resolve PDU at 510. The packet can then be pulled from the packet buffering for processing at 512. When processing of the packet is complete, the process then waits for the next packet at 554.

The process used by the Analysis Engineer looks at transition mapping data. If the runtime information reported by a transition type instruction is from a direct transition at 520 and the target address is not found in the Transition Map Table at 528, the Analysis Engine generates an event with the details of the thread in which the event occurred at 544. If the runtime information reported by a transition type instruction is from an indirect transition at 522 and the target address is in the Code Table at 530 and in the middle of a basic block at 548, the Analysis Engine generates an event at 550 with the details of the thread in which the event occurred. If the runtime information reported by a transition type instruction is from an indirect transition at 522 and the target address is in a region associated with the heap memory at 530 and 548, the Analysis Engine generates an event at 550 with the details of the thread in which the event occurred. If the runtime information reported by a transition type instruction is from an indirect transition at 522 and the target address is in a non-code, non-import-table region of memory at 552, the Analysis Engine generates an event at 556 with the details of the thread in which the event occurred.

The process used by the Analysis Engine looks at Memory Write data at 516. If the runtime information being reported is from a memory write instruction and if the write target address is in a memory region of the V Table at 524, the Analysis Engine generates an event at 536 with the details of the thread in which the event occurred. If the runtime information being reported is from a memory write instruction and if the write target address is in a memory region of the Export Table at 524, the Analysis Engine generates an event at 536 with the details of the thread in which the event occurred. If the runtime information being reported is from a memory write instruction and if the write target address is in the target control section of a heap memory region at 538, the Analysis Engine generates an event at 536 with the details of the thread in which the event occurred. If the runtime information being reported is from a memory write instruction and if the write target address is in the target control section of the stack memory region at 532, the Analysis Engine generates an event 536 with the details of the thread in which the event occurred.

The process used by the Analysis Engine looks at soft spot data at 514. If the instruction is a soft spot instruction and the write target address is in a memory region of the V Table at 524, the Analysis Engine generates an event at 536 with the details of the thread in which the event occurred. If the instruction is a soft spot instruction and the write target address is in the memory region of the Export Table at 524, the Analysis Engine generates an event at 536 with the details of the thread in which the event occurred. If the instruction is a soft spot instruction and the write target address is in the target control section of the heap memory region at 538, the Analysis Engine generates an event at 536 with the details of the thread in which the event occurred. If the instruction is a soft spot instruction and the write target address overwrites the instruction pointer saved in the control region of the stack at a memory location below the base pointer at 532, the Analysis Engine generate an event 536 with the details of the thread in which such an event occurred.

The process used by the Analysis Engine looks at OS functions and system calls at 518. If the instrumentation associated with the entry point of a critical OS function or system call is called at 526 because of an invalid OS function or system call operation at 542, the Analysis Engine generates an event at 544 with the details of the thread on which the event occurred when activities in the Critical OS Function Table occur. This causes an event being generated for calls to code that changes memory access permissions is declared invalid, calls to code that changes privilege levels is declared as potentially invalid, a privilege escalation occurs on a thread servicing a WAN based user is elevated, changes to the No-Execute policy is declared invalid, changes the Address Space Layout Randomization (ASLR) policy is declared invalid, changes the Safe Exception Handling (SEH) policy is declared invalid, calls to admin specified functions are not handled in accordance with the event associated with that particular function call, or calls to admin specified system calls are not handled in accordance with the event associated with that particular system call. In addition, critical system call operations at 526 to heap memory operations at 534 are used to update the heap memory envelop at 540. Those regions of memory that are related to allocation increase the memory envelop size whereas those that de-allocate free up the targeted region.

Figure 6:
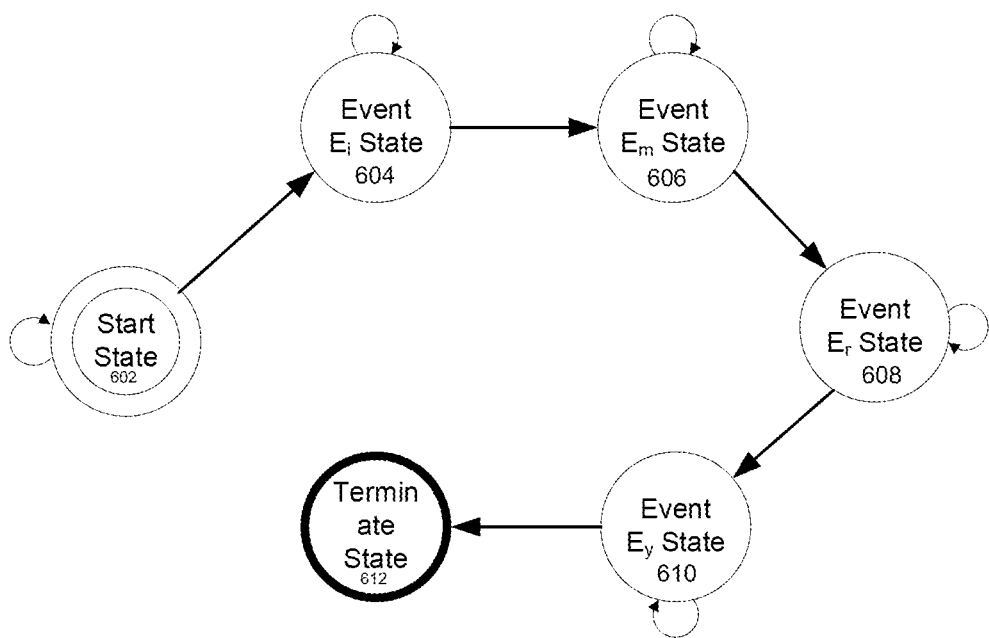
FIG. 6 depicts an example Event Chain State Machine used to track generated events.

FIG. 6 depicts an Event Chain State Machine used to track detected security events. The Path Validation Engine generates events and tracks the state of the events in accordance with the event chain state machine shown. The Event Chain State Machine uses records stored in a Transition Playbook database to track these events. When a new thread starts, the Event Chain state machine is initialized to Start State at 602. The Event Management Engine serializes events so that the set of events on one thread are updated on the state machine for the appropriate thread. As transitions occur on the thread, the state machine records the target address but stays in the Start State. When the Path Validation Engine generates a medium or high severity event, the Event Chain state machine advances to the next state, the $E_i$, state at 604. This new state continues to record the target address of transitions as they occur. This process of the state machine updating to a new state on medium and high severity events and recording transition events continues at 606, 608, and 610 until the thread reaches the Terminate State at 612. The Security Analyst is notified when a highest severity level event is triggered and the Event Chain State Machine captures the forensics when an attack occurs.

Depending on the modes of the system, there are various remedial actions that can be taken in response to events. The remedial actions taken are performed in real-time. One remedial action may consist of shutting down the application. Other remedial actions may be to unbind or release the socket(s) associated with the threads on which the threat has appeared, terminate the thread on which a threat has appeared, and/or blacklisting the user that caused the threat. Another remedial action would be to unblock all sockets associated with the application server's socket(s). This will block all users connected at the time. Yet another remedial action may be to ignore the attack. This may be due to the analyst not considering the attack to be of major consequence. The most appropriate suggested remedial actions for a given event are pre-programmed so that if the security analyst has chosen to operate the Analysis Engine in automatic mode, the remedial action occurs automatically.

The Path Validation Engine of the Analysis Engine can be run in three modes: Monitor, Paranoid or Learning mode. The difference between these modes is how and when to enforce the remedial actions associated with the event(s) received on a given thread in the application. In the Monitor mode, as runtime information arrives and is analyzed by the Analysis Engine, it generates notifications that are directed to the designated security analysts. It is then the security analyst's job to intervene and choose the most appropriate remedial action. The security analyst may decide to change an "ignore" type pre-programmed remedial action to a higher impact remedial action even before the thread has reached the Terminate State. On finalizing the remedial action, the Analysis Engine implements the remedial action when the appropriate authority in the enterprise clears the proposed remedial action for a given thread.

In the paranoid mode, the programmed (default or user configured) remedial action is executed automatically without any manual intervention from the security analyst. In either mode, once the remedial action is ready to be carried out, the Analysis Engine lets the Resolve Client know which remedial action to carry out. The Resolve Client then performs the action associated with the remedial action on the application. Once the remedial action is completed, the Resolve Client sends a confirmation message back to the Analysis Engine. On receiving the acknowledgement, the Analysis Engine performs housekeeping including updating the security analyst.

In learning mode, the Analysis Engine ignores all events and remedial actions. In this mode, the application runs in a pristine environment and records all events and event chains. The security analyst uses this information to build criteria for when an event should be raised and what remedial action should be associated with the said event.

FIG. 7 depicts a high level block diagram of an example Resolve Client and Analysis Engine infrastructure. This infrastructure may be configured on a various hardware including computing devices ranging from smartphones, tablets, laptops, desktops to high end servers. As shown in this figure, data collection performed by the Resolve Client may be segregated from analysis performed by the Analysis Engine to improve application performance. The infrastructure provides high availability to prevent hackers from subverting its protection against malware attacks. The Resolve Client interacts with an application to gather load time and runtime data. The infrastructure of the application 701 includes process memory 703, third-party libraries 704, kernel services 706, and an instruction pipeline 707. The infrastructure of the Resolve Client 702 includes the Instrumentation & Analysis Engine (IAE) 705, graphical user interface (GUI) 711, Client Daemon 708, Configuration database 709, and Streaming and Compression Engine 710, and central processing unit (CPU) 736. Local or remote users 702 of the application 701 interact with the application either through devices like keyboards, mice or similar I/O devices or over a network through a communication channel that may be established by means of pipes, shared memory or sockets. In response the application process 703 dispatches appropriate sets of instructions into the instruction pipeline 707 for execution. The application may also leverage its own or third party libraries 704 such as libc.so (Linux) or msvcrtxx.dll (Windows). As functionality from these libraries is invoked, appropriate instructions from these libraries are also inserted into the instruction pipeline for execution 707. In addition the application may leverage system resources such as memory, file I/O etc. from the kernel 706. These sequences of instructions from the application, libraries and the kernel put together in a time ordered sequence deliver the application functionality desired by a given user.

As the application's code begins to load into memory, the IAE 705 performs several different load time actions. Once all the modules have loaded up, the instrumented instructions of the application generate runtime data. The Client Daemon 708 initializes the Instrumentation and Analysis Engine 705, the Streaming Engine 710 and the GUI 711 processes in the CPU at 736 by reading one or more configuration files from the Configuration database 709. It also initializes intercommunication pipes between the IAE, Streaming Engine, GUI, Analysis Engine and itself. The Client Daemon also ensures that if any Resolve Client process, including itself, becomes unresponsive or dies, it will be regenerated. This ensures that the Resolve Client is a high availability enterprise grade product.

The Instrumentation and Analysis Engine pushes load and runtime data collected from the application into the Streaming Engine. The Streaming Engine packages the raw data from the Resolve Client into the Resolve PDU. Then it pushes the Resolve PDU over a high bandwidth, low latency communication channel 712 to the Analysis Engine 711. If the Client and the analyzer are located on the same machine this channel can be a memory bus. If these entities are located on different hardware but in the same physical vicinity, the channel can be an Ethernet or Fiber based transport, which allows remote connections to be established between the entities to transport the load and runtime data across the Internet.

The infrastructure of the Analysis Engine includes the Network Interface Card (NIC) 713, the Packet Pool 714, the Time Stamp Engine 715, the Processor Fabric 716, the Hashing Engine 717, the TCAM Engine 718, the Application Map database 719, and the Thread Context database 720. The infrastructure of the Analysis Engine further includes the Content Analysis Engine 721, the Events and Event Chains 722, the Event Management Engine 723, the Event Log 724, the Application Daemon 725, the Analysis Engine Configuration database 726, the Network Interface 727, the Dashboard 728, the SMS/SMTP Server 729, the OTP Server 730, the Upgrade Client 731, the Software Upgrade Server 732, Software Images 733, the Event Update Client 734, and the Event Upgrade Server 735.

The Resolve PDU together with the protocol headers is intercepted at the Network Interface Card 713 from where the Resolve PDU is pulled and put into the Packet Pool 714. The timestamp fields in the Resolve PDU are filled up by the Time Stamp Engine 715. This helps to make sure that no packet is stuck in the packet Pool buffer for an inordinately long time.

The Processor Fabric 716 pulls packets from the packet buffer and the address fields are hashed and replaced in the appropriate location in the packet. This operation is performed by the Hashing Engine 717. Then the Processor Fabric starts removing packets from the packet buffer in the order they arrived. Packets with information from the load time phase are processed such that the relevant data is extracted and stored in the Application Map database 719. Packets with information from the runtime phase are processed in accordance with FIG. 5. The efficiency of the Analysis Engine can be increased or decreased based on the number of processors in the Processor Fabric.

The transition target data is saved in the Thread Context database 720 which has a table for each thread. The Processor fabric also leverages the TCAM Engine 718 to perform transition and memory region searches. Since the processor fabric performing lookups using hashes, the actual time used is predictable and very short. By choosing the number of processors in the fabric carefully, per packet throughput can be suitable altered.

When the Analysis Engine performs searches, it may, from time to time find an invalid transition, invalid operation of critical/admin functions or system calls, or find a memory write on undesirable locations. In each of these cases, the Analysis Engine dispatches an event of the programmed severity as described by the policy stored in the Event and Event Chain database 722 to the Event Management Engine 723. The raw event log is stored in the Event Log Database 724. The Dashboard can also access the Event Log and display application status.

A remedial action is also associated with every event in the Event and Event Chain database 722. A user can set the remedial action from a range of actions from ignoring the event in one extreme to terminating the thread in the other extreme. A recommended remedial action can be recommended to the analyst using the Event Update Client 734 and Event Upgrade Server 735. In order to change the aforementioned recommended action, an analyst can use the Dashboard 728 accordingly. The Dashboard provides a GUI interface that displays the state of each monitored application and allows a security analyst to have certain control over the application, such as starting and stopping the application. When an event is generated, the Event Chain advances from the normal state to a subsequent state. The remedial action associated with the new state can be taken. If the remedial action involves a non-ignore action, a notification is sent to the Security Analyst using and SMS or SMTP Server 729. The SMS/SMTP address of the security analyst can be determined using an LDAP or other directory protocol. The process of starting or stopping an application from the Dashboard requires elevated privileges so the security analyst must authenticate using an OTP Server 730.

New events can also be created and linked into the Event and Event Chain database 722 with a severity and remedial action recommended to the analyst. This allows unique events and event chains for a new attack at one installation to be dispatched to other installations. For this purpose, all new events and event chains are loaded into the Event Upgrade Server 735. The Event Update Client 734 periodically connects and authenticates to the Event Upgrade Server to retrieve new events and event chains. The Event Update Client then loads these new events and event chains into the Events and Events Chain database 722. The Content Analysis Engine 721 can start tracking the application for the new attacks encapsulated into the new event chains.

Just as with the Client Daemon, the Appliance Daemon 725 is responsible for starting the various processes that run on the Analysis Engine. For this purpose, it must read configuration information from the Analysis Engine Configuration database 726. The daemon is also responsible for running a heartbeat poll for all processes in the Analysis Engine. This ensures that all the devices in the Analysis Engine ecosystem are in top working condition at all times. Loss of three consecutive heartbeats suggests that the targeted process is not responding. If any process has exited prematurely, the daemon will revive that process including itself.

From time to time, the software may be upgraded in the Appliance host, or of the Analysis Engine or of the Client for purposes such as fixing errors in the software. For this purpose, the Upgrade Client 731 constantly checks with the Software Upgrade Server 732 where the latest software is available. If the client finds that the entities in the Analysis Engine or the Client are running an older image, it will allow the analysts to upgrade the old image with a new image from the Software Upgrade Server 732. New images are bundled together as a system image 733. This makes it possible to provision the appliance or the host with tested compatible images. If one of the images of a subsystem in the Analysis Engine or the Resolve Client does not match the image for the same component in the System image, then all images will be rolled to a previous known good system image.

Figure 8:
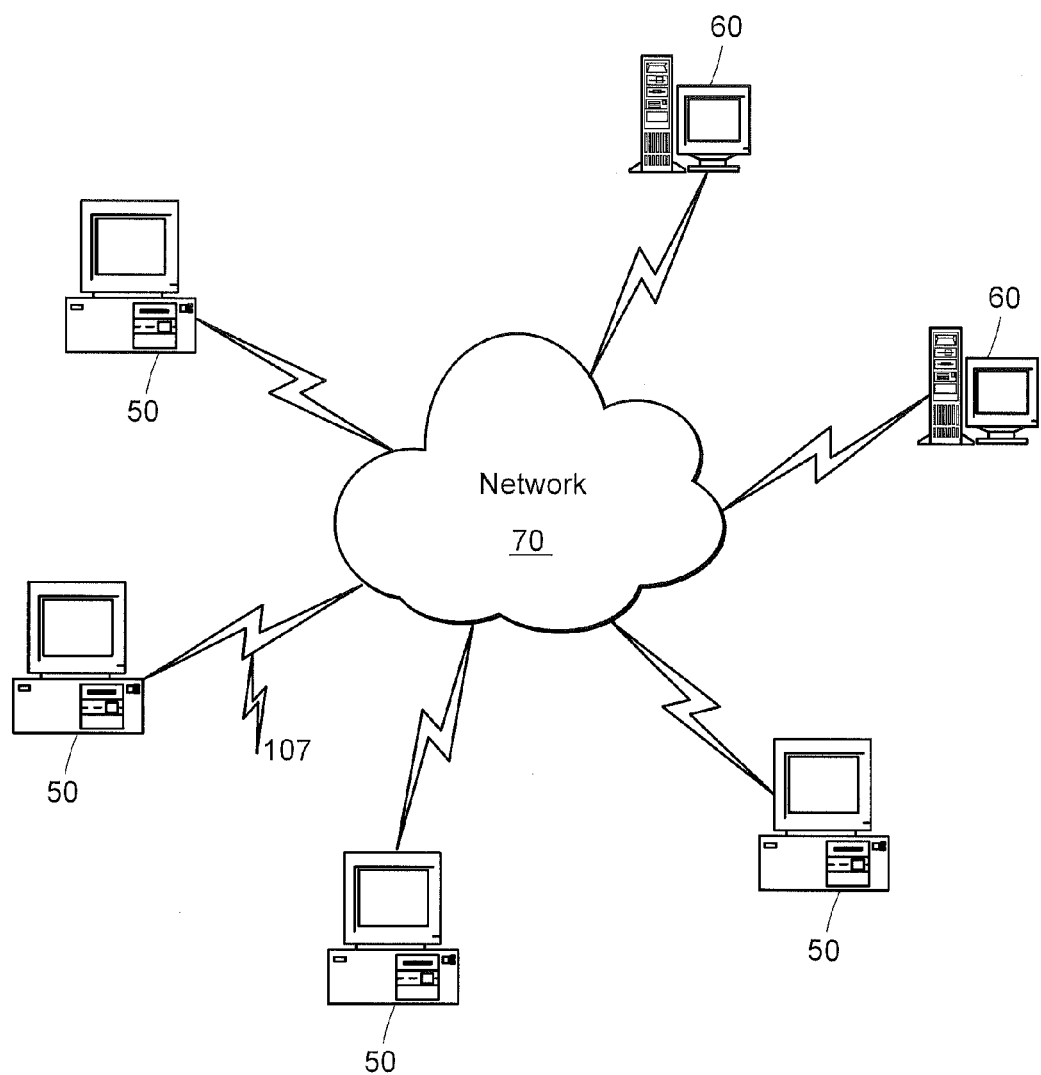
FIG. 8 illustrates a computer network or similar digital processing environment in which embodiments of the present invention may be implemented.

FIG. 8 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 9:
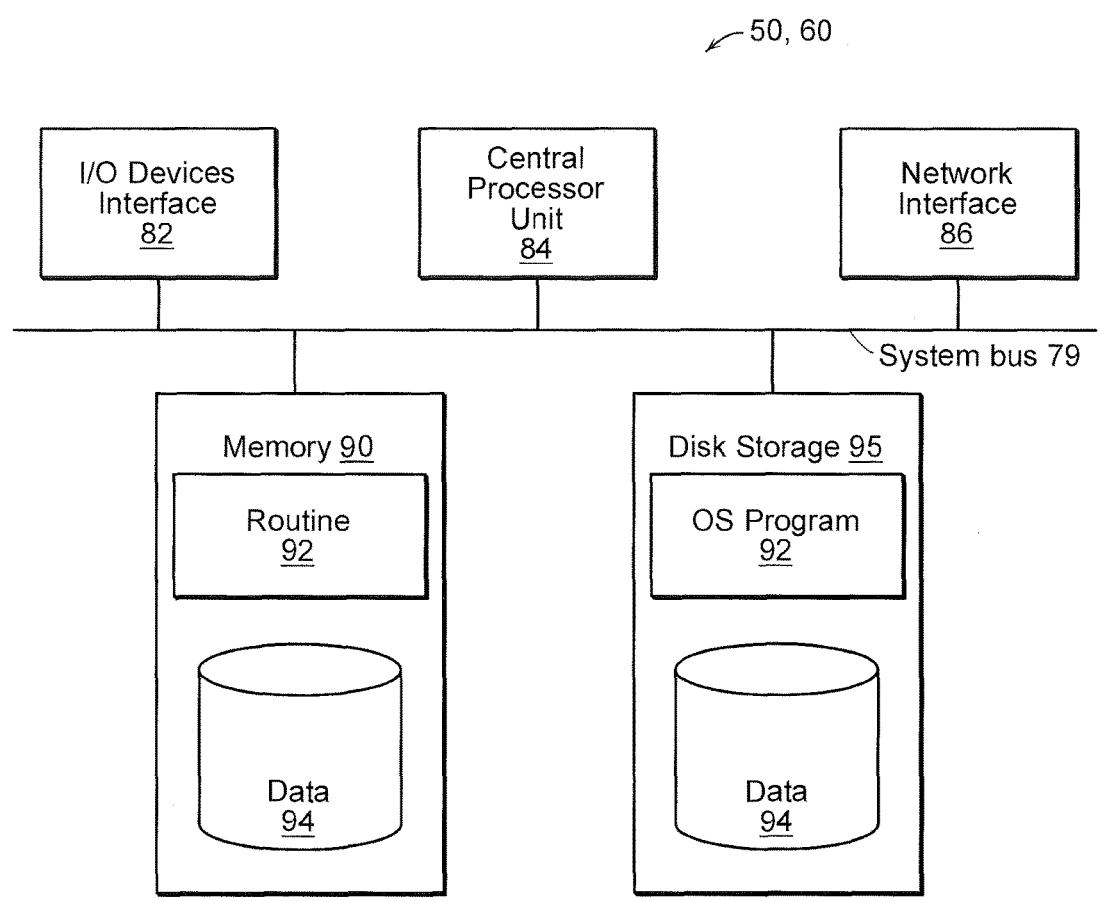
FIG. 9 is a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present invention (e.g., resolve client and analysis engine elements described herein). Disk storage 95 provides non-volatile storage for computer software instructions 92 and data 94 used to implement an embodiment of the present invention. A central processor unit 84 is also attached to the system bus 79 and provides for the execution of computer instructions.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method comprising:
   extracting a model of a computer application during load time, the extracting includes:
      identifying address transitions that map instruction addresses to respective target addresses, and
      adding an identified address transition to the model when a respective target address is indeterminable and adding the respective target address to the model when the respective target address is determinable;
   storing the model of the computer application;
   inserting one or more collection instructions into the computer application, including at the instruction addresses and respective determinable target addresses in the extracted model, to collect data at runtime;
   analyzing the data collected at runtime against the stored model of the computer application, including address transitions and target addresses, to detect one or more security events; and
   tracking the one or more security events using a state machine, the tracking automatically detecting a security attack of the computer application.

2. The method of claim 1 wherein extracting the model of the computer application includes one or more of extracting transition mapping data from the computer application, extracting memory mapping data from the computer application, extracting soft spot data from the computer application, and extracting OS functions and system calls referenced by the computer application.

3. The method of claim 1 wherein extracting the model of the computer application is accomplished at least in part using a code disassembler.

4. The method of claim 1 wherein the computer application is formatted in binary or an interpreted language.

5. The method of claim 1 further comprising:
checking the computer application for integrity during load time.

6. The method of claim 5 wherein checking the computer application for integrity comprises computing a checksum.

7. The method of claim 1 wherein storing the model includes storing the model in a database that contains one or more tables for modeling the computer application.

8. The method of claim 1 wherein storing the model includes storing the model in a database on a remote system.

9. The method of claim 8 further comprising packaging the model of the computer application for transmission to the remote system for storing in the database.

10. The method of claim 9 further comprising placing a canary into the transmission to secure the transmission.

11. The method of claim 1 wherein inserting instructions into the computer application is accomplished at least in part using a dynamic binary analysis engine or a byte code instrumentation engine.

12. The method of claim 1 further comprising packaging the data collected at runtime for transmission to one or more processes.

13. The method of claim 12 wherein the one or more processes are on a remote system.

14. The method of claim 12 further comprising placing a canary into the transmission to secure the transmission.

15. The method of claim 1 wherein the data collected at runtime comprises data for one or more threads of the computer application.

16. The method of claim 1 wherein analyzing the data collected at runtime against the stored model of the computer application comprises one or more of analyzing transition data, analyzing OS functions, analyzing system calls, analyzing memory writes, and analyzing soft spot data.

17. The method of claim 1 wherein tracking the one or more security events comprises correlating the one or more security events based on a predefined sequence.

18. The method of claim 17 wherein the predefined sequence is based on an immutable chain.

19. The method of claim 1 wherein tracking the one or more security events includes capturing forensic data for the events.

20. The method of claim 1 wherein the one or more security events are tracked based on severity of the one or more security event.

21. The method of claim 1 further comprising taking one or more actions in response to tracking the one or more security events.

22. The method of claim 21 wherein the one or more actions is automatically taken by a system.

23. The method of claim 21 wherein the one or more actions is taken by a user.

24. The method of claim 21 wherein the one or more actions include any of terminating the computer application, terminating one or more threads of the computer application, closing a socket on one or more threads of the computer application, and generating alerts in response to the one or more security events.

25. The method of claim 21 wherein the one or more actions taken in response to tracking the one or more security events is adjustable.

26. The method of claim 1 wherein tracking the one or more security events further comprises adding one or more new security events with associated severity and actions for tracking using the state machine.

27. A computer-implemented method comprising:
extracting a model of a computer application during load time, the extracting includes:
identifying address transitions that map instruction addresses to respective target addresses, and
adding an identified address transition to the model when a respective target address is indeterminable and adding the respective target address to the model when the respective target address is determinable;
storing the model of the computer application;
inserting one or more collection instructions into the computer application, including at the instruction addresses and respective determinable target addresses in the extracted model, to collect data at runtime; and
automatically detecting a security attack of the computer application based on comparing the stored model to the collected data.

28. The method of claim 27 wherein extracting the model of the computer application includes one or more of extracting transition mapping data from the computer application, extracting memory mapping data from the computer application, extracting soft spot data from the computer application, and extracting OS functions and system calls referenced by the computer application.

29. The method of claim 27 wherein extracting a model of the computer application is accomplished at least in part using a code disassembler.

30. The method of claim 27 wherein the computer application is formatted in binary or an interpreted language.

31. The method of claim 27 further comprising:
checking the computer application for integrity during load time.

32. The method of claim 31 wherein checking the computer application for integrity comprises computing a checksum.

33. The method of claim 27 wherein storing the model includes storing the model in a database that contains one or more tables for modeling the computer application.

34. The method of claim 27 wherein storing the model includes storing the model in a database on a remote system.

35. The method of claim 34 further comprising packaging the model of the computer application for transmission to the remote system for storing in the database.

36. The method of claim 35 further comprising placing a canary into the transmission to secure the transmission.

37. The method of claim 27 wherein inserting instructions into the computer application is accomplished at least in part using a dynamic binary analysis engine or a byte code instrumentation engine.

38. The method of claim 27 further comprising packaging the data collected at runtime for transmission to one or more processes.

39. The method of claim 38 wherein the one or more processes are on a remote system.

40. The method of claim 38 further comprising placing a canary into the transmission to secure the transmission.

41. The method of claim 27 wherein the data collected at runtime comprises data for each thread of the computer application.

42. A computer-implemented method comprising:
analyzing data collected at runtime for a computer application against a stored model of the computer application to detect one or more security events, (i) the stored model includes address transitions that map instruction addresses to respective target addresses when the respective target addresses are indeterminable at load time, and (ii) the stored model includes the respective target addresses when the respective target addresses are determinable at load time; and tracking the one or more security events using a state machine, the tracking automatically detecting a security attack of the computer application.

43. The method of claim 42 further comprising receiving the data collected at runtime from a process on a remote system.

44. The method of claim 42 further comprising receiving the stored model of the computer application from a process on a remote system.

45. The method of claim 42 wherein analyzing the data collected at runtime against the stored model of the computer application comprises one or more of analyzing transition data, analyzing OS functions, analyzing system calls, analyzing memory writes, and analyzing soft spot data.

46. The method of claim 42 wherein tracking the one or more security events comprises correlating the one or more security events based on a predefined sequence.

47. The method of claim 46 wherein the predefined sequence is based on an immutable chain.

48. The method of claim 42 wherein tracking the one or more security events comprises capturing forensic data.

49. The method of claim 42 wherein tracking the one or more security events based on severity of the one or more security event.

50. The method of claim 42 further comprising taking one or more actions in response to tracking the one or more security events.

51. The method of claim 50 wherein the one or more actions are automatically taken by a system.

52. The method of claim 50 wherein the one or more actions are taken by a user.

53. The method of claim 50 wherein the one or more actions include any of terminating the computer application, include terminating one or more threads of the computer application, include closing a socket on one or more threads of the computer application, and generating alerts in response to the one or more security events.

54. The method of claim 50 wherein the one or more actions taken in response to tracking the one or more security events are adjustable.

55. The method of claim 42 wherein tracking the one or more security events further comprises adding one or more new security events with associated severity and actions for tracking using the state machine.

56. A system comprising:
at least one processor configured to implement:
a client configured to extract a model of a computer application during load time, wherein the extracting includes the client:
identifying address transitions that map instruction addresses to respective target addresses, and
adding an identified address transition to the model when a respective target address is indeterminable and adding the respective target address to the model when the respective target address is determinable;
the client further configured to store the model of the computer application,
the client further configured to insert one or more collection instructions into the computer application, including at the instruction addresses and respective determinable target addresses in the extracted model, to collect data at runtime; and
an analysis engine configured to analyze data collected at runtime against the stored model of the computer application, including address transitions and target addresses, to detect one or more security events;
the analysis engine configured to track the one or more security events using a state machine, the tracking automatically detecting a security attack of the computer application.

57. The system of claim 56 wherein extracting the model of the computer application includes one or more of extracting transition mapping data from the computer application, extracting memory mapping data from the computer application, extracting soft spot data from the computer application, and extracting OS functions and system calls referenced by the computer application.

58. The system of claim 56 wherein extracting the model of the computer application is accomplished at least in part using a code disassembler.

59. The system of claim 56 wherein the computer application is formatted in binary or an interpreted language.

60. The system of claim 56 further comprising:
the client further configured to check the computer application for integrity during load time.

61. The system of claim 60 wherein checking the computer application for integrity comprises computing a checksum.

62. The system of claim 56 wherein storing the model includes storing the model in a database that contains one or more tables for modeling the computer application.

63. The system of claim 62 wherein storing the model includes storing the model in a database on a remote system.

64. The system of claim 63 wherein the client is further configured to package the model of the computer application for transmission to the remote system for storing in the database.

65. The system of claim 64 wherein the client is further configured to place a canary into the transmission to secure the transmission.

66. The system of claim 56 wherein inserting instructions into the computer application is accomplished at least in part using a dynamic binary analysis engine or a byte code instrumentation engine.

67. The system of claim 56 wherein the client is further configured to package the data collected at runtime for transmission to the analysis engine.

68. The system of claim 67 wherein the client is further configured to place a canary into the transmission to secure the transmission.

69. The system of claim 67 wherein the transmission to the analysis engine comprises sending the data collected on a transport channel between the client and the analysis engine.

70. The system of claim 56 wherein the data collected at runtime comprises data for one or more threads of the computer application.

71. The system of claim 56 wherein analyzing the data collected at runtime against the stored model of the computer application comprises one or more of analyzing transition data, analyzing system calls, analyzing memory writes, and analyzing soft spot data.

72. The system of claim 56 wherein tracking the one or more security events comprises correlating the one or more security events based on a predefined sequence.

73. The system of claim 72 wherein the predefined sequence is based on an immutable chain.

74. The system of claim 56 wherein tracking the one or more security events includes capturing forensic data for the events.

75. The system of claim 56 wherein the one or more security events are tracked based on severity of the one or more security event.

76. The system of claim 56 wherein the client is further configured to take one or more actions in response to tracking one or more security events.

77. The system of claim 76 wherein the one or more actions is automatically taken by a system.

78. The system of claim 76 wherein the one or more actions is taken by a user.

79. The system of claim 76 wherein the one or more actions include any of terminating the computer application, include terminating one or more threads of the computer application, include closing a socket on one or more threads of the computer application, and include generating alerts in response to the one or more security events.

80. The system of claim 76 wherein the one or more actions taken in response to tracking the one or more security events are adjustable.

81. The system of claim 56 wherein at least one of the client and the analysis engine is configured to run on any of a smartphone, tablet, laptop, desktops, and high end server.

82. The system of claim 56 wherein the analysis engine comprises a processor fabric comprising one or more processors.

83. The system of claim 56 wherein the client comprises a client daemon configured to restart one or more processes of the client if the one or more processes dies or become unresponsive.

84. The system of claim 56 wherein the analysis engine comprises an application daemon configured to restart one or more processes of the analysis engine if the one or more processes dies or become unresponsive.

85. The system of claim 56 wherein the analysis engine comprises a dashboard configured to display the state of the computer application.

86. The system of claim 56 wherein the client is further configured to add one or more new security events with associated severity and actions for tracking using the state machine.

87. An apparatus comprising:
a processor configured to execute a first process and a second process;
the first process configured to extract a model of a computer application during load time, wherein the extracting includes the first process:
identifying address transitions that map instruction addresses to respective target addresses, and
adding an identified address transition to the model when a respective target address is indeterminable and adding the respective target address to the model when the respective target address is determinable;
the first process further configured to store the model of the computer application;
the second process configured to insert one or more collection instructions into the computer application, including at the instruction addresses and respective determinable target addresses in the extracted model, to collect data at runtime; and
the second process further configured to automatically detect a security attack of the computer application based on comparing the stored model to the collected data.

88. The apparatus of claim 87 wherein extracting the model of the computer application includes one or more of extracting transition mapping data from the computer application, extracting memory mapping data from the computer application, extracting soft spot data from the computer application, and extracting OS function and system calls referenced by the computer application.

89. The apparatus of claim 87 wherein extracting a model of the computer application is accomplished at least in part using code disassembler.

90. The apparatus of claim 87 wherein the computer application is formatted in binary or an interpreted language.

91. The apparatus of claim 87 further comprising:
a third process configured to check the computer application for integrity during load time.

92. The apparatus of claim 91 wherein checking the computer application for integrity comprises computing a checksum.

93. The apparatus of claim 87 wherein that database contains one or more tables for modeling the computer application.

94. The apparatus of claim 87 wherein the database is on a remote system.

95. The apparatus of claim 94 further comprising the first process packaging the model of the computer application for transmission to the remote system for storing in the database.

96. The apparatus of claim 95 wherein the first process is further configured to place a canary into the transmission to secure the transmission.

97. The apparatus of claim 94 wherein inserting instructions into the computer application is accomplished at least in part using a dynamic binary analysis engine or a byte code instrumentation engine.

98. The apparatus of claim 94 further comprising a third process configured to package the data collected at runtime for transmission to one or more processes.

99. The apparatus of claim 98 wherein the one or more processes are on a remote system.

100. The apparatus of claim 98 wherein the third process is further configured to place a canary into the transmission to secure the transmission.

101. The apparatus of claim 94 wherein the data collected at runtime comprises data for each thread of the computer application.

102. An apparatus comprising:
a processor configured to execute a first process and a second process;
the first process configured to analyze data collected at runtime for a computer application against a stored model of the computer application to detect one or more security events, (i) the stored model includes address transitions that map instruction addresses to respective target addresses when the respective target addresses are indeterminable at load time, and (ii) the stored model includes the respective target addresses when the respective target addresses are determinable at load time; and
the second process configured to track the one or more security events using a state machine, the tracking automatically detecting a security attack of the computer application.

103. The apparatus of claim 102 wherein the data collected at runtime is received from a process on a remote system.

104. The apparatus of claim 102 wherein the stored model of the computer application is received from a process on a remote system.

105. The apparatus of claim 102 wherein analyzing the data collected at runtime against the stored model of the computer application comprises one or more of analyzing transition data, analyzing OS functions, analyzing system calls, analyzing memory writes, and analyzing soft spot data.

106. The apparatus of claim 102 wherein tracking the one or more security events comprises correlating the one or more security events based on a predefined sequence.

107. The apparatus of claim 106 wherein the predefined sequence is based on an immutable chain.

108. The apparatus of claim 102 wherein tracking the one or more security events comprises capturing forensic data.

109. The apparatus of claim 102 wherein tracking the one or more security events based on severity of the one or more security event.

110. The apparatus of claim 102 further comprising a third process configured to take one or more actions in response to tracking the one or more security events.

111. The apparatus of claim 110 wherein the one or more actions is taken automatically.

112. The apparatus of claim 110 wherein the one or more actions are taken by a user.

113. The apparatus of claim 110 wherein the one or more actions include any of terminating the computer application, include terminating one or more threads of the computer application, include closing a socket on one or more threads of the computer application, and generating alerts in response to the one or more security events.

114. The apparatus of claim 110 wherein the one or more actions taken in response to tracking the one or more security events are adjustable.

115. The apparatus of claim 102 wherein the second process is further configured to add one or more new security events with associated severity and actions for tracking using the state machine.

* * * * *